United States Patent
Clausen et al.

(10) Patent No.: US 12,013,366 B2
(45) Date of Patent: Jun. 18, 2024

(54) MAGNESIUM ION SELECTIVE PVC MEMBRANES

(71) Applicant: Radiometer Medical ApS, Bronshoj (DK)

(72) Inventors: Lydia Dahl Clausen, Bronshoj (DK); Thomas Hansen, Bronshoj (DK)

(73) Assignee: Radiometer Medical ApS, Bronshoj (DK)

( * ) Notice: Subject to any disclaimer, the term of this patent is extended or adjusted under 35 U.S.C. 154(b) by 753 days.

(21) Appl. No.: 17/256,305

(22) PCT Filed: Jun. 21, 2019

(86) PCT No.: PCT/EP2019/066508
§ 371 (c)(1),
(2) Date: Dec. 28, 2020

(87) PCT Pub. No.: WO2020/007626
PCT Pub. Date: Jan. 9, 2020

(65) Prior Publication Data
US 2021/0262972 A1    Aug. 26, 2021

(30) Foreign Application Priority Data
Jul. 4, 2018  (DK) ................................ 2018 00324

(51) Int. Cl.
*G01N 27/333*    (2006.01)
(52) U.S. Cl.
CPC .............................. *G01N 27/3335* (2013.01)

(58) Field of Classification Search
CPC .......................... G01N 27/3335; G01N 27/414
See application file for complete search history.

(56) References Cited

U.S. PATENT DOCUMENTS

| 4,272,328 A | 6/1981 | Kim et al. |
| 5,336,388 A * | 8/1994 | Leader ................. G01N 27/403 204/422 |

(Continued)

FOREIGN PATENT DOCUMENTS

| JP | S56-92422 A | 7/1981 |
| JP | 2002-510540 A | 4/2002 |
| WO | WO 92/16831 | 10/1992 |

OTHER PUBLICATIONS

Agilent Technologies—"Polymer Molecular Weight Distribution and Definitions of MW Averages", author not known 2015 downloaded from chrome-extension://efaidnbmnnnibpcajpcglclefindmkaj/ https://www.agilent.com/cs/library/technicaloverviews/public/5990-7890EN.pdf (Year: 2015).*

(Continued)

*Primary Examiner* — Alexander S Noguerola
(74) *Attorney, Agent, or Firm* — FINNEGAN, HENDERSON, FARABOW, GARRETT & DUNNER, LLP

(57) ABSTRACT

Ion selective membranes and the preparation thereof, such as magnesium ion selective membranes and the preparation thereof. In particular, the invention describes improved PVC polymer blends for use in ion selective membranes. The invention furthermore relates to electrodes and potentiometric sensors comprising such membranes and the use thereof for determining ion concentrations in samples.

28 Claims, 2 Drawing Sheets

(56) References Cited

U.S. PATENT DOCUMENTS

| | | | |
|---|---|---|---|
| 5,651,876 A * | 7/1997 | West | G01N 27/4166 205/789.5 |
| 2009/0020423 A1* | 1/2009 | Hsiung | G01N 27/333 204/192.1 |

OTHER PUBLICATIONS

Keil et al. "ion-Selective Electrode Membrane System Base on a Vinyl Chloride-Vinyl Alcohol Copolymer Matrix and Its Role for Accommodating Grafted Alkyl Phosphate Sensors," Analyst, Apr. 1977, vol. 102, pp. 274-280 (Year: 1977).*

"ion-Selective Electrodes" in LibreTexts, author unknown, downloaded https://chem.libretexts.org/Bookshelves/Analytical_Chemistry/ Supplemental_Modules_(Analytical_Chemistry)/Analytical_Sciences_ Digital_Library/Courseware/Analytical_Electrochemistry%3A_ Potentiometry/03_Potentiometric_Theory/0 (Year: 2023).*

Simon et al., "The effect of poly(vinyl chloride) blends on the mechanical properties of highly plasticized membranes", POLYMER vol. 35 No. 18 1994, pp. 3966-3977 (Year: 1994).*

Saad et al., "Polyvinyl Chloride-Based Membranes for Flow Injection Analysis of Quinones in Beverages," Journal of AOAC International vol. 84, No. 4, 2001, pp. 1151-1158 (Year: 2001).*

Vytas et al., "Testing of Some Nitro Compounds as New Plasticizers of Polymeric membrane-Based Electrodes," Scientific Papers of the University of Pardubice—Series A—Faculty of Chemical Technology 3 (1997) pp. 323-332 (Year: 1997).*

Moody et al., Selectivity Rating of Calcium Ion-selective Electrodes, Proc. Analyt. Div. Chem., Jan. 1979, pp. 32-37 (Year: 1979).*

Thomas Henry Wilmer Ryan thesis entitled, "An Investigation of the Factors Influencing Response Times of Ion Selective Electrodes," Department of Chemistry, Imperial College of Science and Technology, Jul. 1974 (Year: 1974).*

Campanella, L. et al., "Sensitive membrane ISFETs for nitrate analysis in waters," Sensors and Actuators B, 26-27, pp. 329-335 (1995).

Cha, Geun Sig et al., "Electrochemical Performance, Biocompatibility, and Adhesion of New Polymer Matrices for Solid-State Ion Sensors," Anal. Chem., 63, pp. 1666-1672 (1991).

Goldberg, H.D et al., "Ion-Selective Sensors Incorporating Strongly Adhesive Polymeric Membranes," pp. 169-172 (1990).

Moody, G.J. et al., "Modified Poly(vinyl chloride) Matrix Membranes for Ion-selective Field Effect Transistor Sensors," ANALYST, vol. 113, pp. 1703-1707 (1988).

Poly(vinyl chloride) carboxylated, Sigma-Aldrich (two pages).

Poly(vinyl chloride-co-vinyl acetate-co-vinyl alcohol), Sigma-Aldrich (two pages).

Pub Chem, SID 24856797 (four pages).

Pub Chem. SID 24887766 (four pages).

Thomas, J. D. R., "Solvent Polymeric Membrane Ion-Selective Electrodes," Analytica Chimica Acta, 180, pp. 289-297 (1986).

International Search Report for International Application No. PCT/ EP2019/066508, dated Sep. 26, 2019 (four pages).

Written Opinion of the International Searching Authority for International Application No. PCT/EP2019/066508 (ten pages).

Japanese Office Action related to Japanese Patent Application No. 2021-500025, dated Mar. 24, 2022.

* cited by examiner

MAGNESIUM ION SELECTIVE PVC MEMBRANES

This application is a national stage filing under 35 U.S.C. § 371 of International Application No. PCT/EP2019/066508, filed on Jun. 21, 2019, which claims priority of Danish Patent Application No. PA 2018 00324, filed on Jul. 4, 2018. The contents of these applications are each incorporated herein by reference in their entirety.

FIELD OF THE INVENTION

The invention relates to ion selective membranes and the preparation thereof, in particular magnesium ion selective membranes and the preparation thereof. The invention furthermore relates to electrodes and potentiometric sensors comprising such membranes and the use thereof for determining ion concentrations in samples.

BACKGROUND OF THE INVENTION

Ion selective electrodes are electrodes that when used in a potentiometric sensor allow determination of the activity of an analyte ion in the presence of other interfering ions. A broad range of electrodes and sensors selective for various anions and cations is available. However, finding a suitable composition for a membrane to be used in an ion selective electrode is challenging as many requirements, including sufficient membrane integrity, stability, sensitivity, lack of bias and interference, etc., need to be fulfilled.

Magnesium is a common metal in the human body and plays an important role in chemical and biochemical processes. Magnesium in the body is either protein-bound, complexed to anions or present as a free ionized fraction (iMg). The iMg fraction plays several physiological roles, e.g. as an ion channel adjuster in nerve conduction or skeletal, cardiac or uterine muscle contraction. A high prevalence of hypomagnesemia (11%) and hypermagnesemia (9.3%) has been found in a study amongst hospitalized patients (Wong et al. (1983) Am J Clin Pathol 79:348).

Specific measurement of iMg is challenging and, historically, clinical laboratories have often relied on total magnesium assays. Magnesium ion selective sensors have been described in WO92/16831 (Nova Biomedical Corp.), which discloses a magnesium selective membrane including a 1,10-phenanthroline as a magnesium ion selective compound in a matrix comprising poly(vinyl)chloride (PVC). Further sensor membranes comprising PVC have been described in WO2016/126593 (Siemens), WO2018/208742 (Siemens) and WO2019/055622 (Siemens). WO2015/160755 (Siemens Healthcare Diagnostics Inc.) describes a membrane for detecting ionized magnesium comprising ionophores having a tripodal stereochemical structure, a lipophilic borate salt and a polymer matrix.

Rendering membranes highly selective for iMg remains a challenge, in particular obtaining selectivity for magnesium ions over other cations, such as calcium ions. Furthermore, in addition to having limited selectivity, ion selective membranes, in particular magnesium ion selective membranes, described in the art are often suboptimal in terms of mechanical stability, e.g. due to plasticizer being expelled from the membrane ("bleeding").

Thus, there is a need for improved ion selective membranes that do not bleed and have little or no deviation from reference (bias), yet remain highly selective for the analyte, remain resistant to interference and drift, and have a rapid start-up time. These needs are addressed by the current invention.

SUMMARY OF THE INVENTION

In a first aspect, the invention relates to an ion-selective membrane comprising an ionophore and a polymer blend, wherein said polymer blend comprises:
 a. a first polymer which is carboxylated poly(vinyl chloride) or poly(vinyl chloride), wherein the molecular weight of said first polymer is from 100,000 to 500,000, and
 b. a second polymer, which is a co-polymer of vinyl chloride and at least one further monomer group having a hydrophilic group, wherein the molecular weight of said second polymer is below 100,000,
wherein, if said first polymer is carboxylated poly(vinyl chloride), said second polymer has more hydrophilic groups than said first polymer.

When used herein in connection with a polymer, the term molecular weight refers to the weight average molecular weight, calculated by:
$M_W = \Sigma W_i M_i$, wherein $W_i$ is the weight fraction of polymer with molecular weight $M_i$ In a further aspect, the invention relates to a process for preparing an ion selective membrane of the invention by mixing the components in a solvent, dispensing the resulting solution on a desired support and allowing the solvent to evaporate.

In a further aspect, the invention provides an electrode for determining the ion concentration of a liquid sample comprising the membrane of the invention as defined herein.

In an even further aspect, the invention provides a potentiometric sensor for determining the ion concentration of a liquid sample comprising a membrane of the invention or an electrode of the invention.

Furthermore, the invention relates to a method for determining the ion concentration of a liquid sample comprising contacting said sample with an electrode according to the invention or a potentiometric sensor according to the invention and determining the ion concentration based on signal provided by said electrode or potentiometric sensor. The invention also relates to a method for diagnosing a disease or disorder comprising performing the method for determining the ion concentration according to the invention on a sample of a subject.

These and other aspects and embodiments of the invention are described in further detail below.

DETAILED DESCRIPTION OF THE INVENTION

Definitions

Figure 1A:
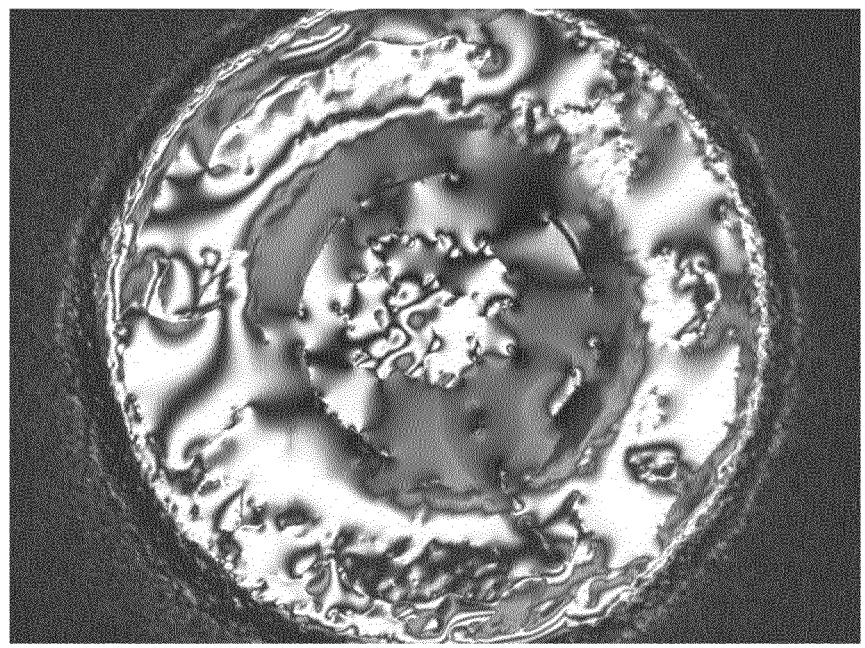
FIG. 1: Sensor membrane bleeding as analyzed through optical microscopy. Panels A and B: Membranes wherein the polymer content was 100% poly(vinyl chloride-co-vinyl acetate-co-vinyl alcohol) (Mg616 and Mg626, respectively). Panel C: Membrane comprising poly(vinyl chloride) and poly(vinyl chloride-co-vinyl acetate-co-vinyl alcohol) in a 4:1 ratio (Mg652). Panel D: Membrane comprising carboxylated PVC and poly(vinyl chloride-co-vinyl acetate-co-vinyl alcohol) in a 1:2 ratio (Mg654).

The term "selective" when used herein in the context of a membrane refers to a preference for a particular ion.

"selective" when used herein does not mean absolute or exclusive selectivity, i.e. a membrane can be selective for multiple ions, e.g. magnesium ions as well as calcium ions.

When used herein, the term "ionophore" refers to a compound that reversibly binds ions, e.g. a compound that can transport ions across a membrane.

The term "lipophilic" when used herein, in particular in the context of a "lipophilic compound", refers to the ability of a chemical compound to dissolve in fats, oils, lipids, or non-polar solvents.

The term "acidic group" refers to a group capable of ionizing to donate a hydrogen ion to a base.

The term "salt" when used herein refers to a deprotonated form of an acid together with a cationic species to counter-balance the negative charge thereof.

When used herein, the term "substituted form" of 1,10-phenanthroline refers to a substance which comprises a 1,10-phenanthroline skeleton containing one or more substitutions thereto. The term "substitution" refers to the replacement of a hydrogen on 1,10-phenanthroline with a group R or residue R. Similarly, "substituted aryl" refers to an aryl group wherein a hydrogen has been replaced with a different residue or group.

The term "$C_{XX-YY}$" in the context of a chemical group indicates that the group contains from XX to YY carbon atoms, i.e. any number starting from XX up to and including YY, for example a $C_{1-18}$ alkyl group contains 1, 2, 3, 4, 5, 6, 7, 8, 9, 10, 11, 12, 13, 14, 15, 16, 17 or 18 carbon atoms. Unless specified otherwise, such a group may be linear or branched.

When referring to chemical groups, the terms "alkyl", "aryl", "alkenyl" and "alkynyl" have their usual meaning in the art. In some embodiments, such groups comprise no more than 18 carbon atoms. The term "branched alkyl" refers to an alkyl group which is not fully linear, i.e. has at least one side-chain.

The term "polymer blend", when used herein, refers to a mixture of two or more different polymers.

The term "logP" refers to a measure of a ratio of concentrations of a compound in a mixture of two immiscible phases (e.g. water and 1-octanol) at equilibrium.

The term "concentration" when used herein in the context of determining a concentration of ions, such as magnesium ions, in a sample, refers to the stoichiometric concentration of the ion in a standardized solution matrix (reference scale) having an ion activity which is equal to that of the measured sample, cf. IFCC guidelines (Ben Rayana et al. (2008) Clin Chem Lab Med 46(1):21).

FURTHER ASPECTS AND EMBODIMENTS OF THE INVENTION

The inventors have developed ion selective membranes that have improved performance compared to membranes previously described in the art. In particular, the membranes of the invention have a smooth surface, have high in-use stability, exhibit low plasticizer bleeding and zinc ion interference and show a good tolerance to surfactant. Furthermore, the membranes have fast viscosity increase during drying.

As described above, in a first main aspect, the invention relates to an ion-selective membrane comprising an ionophore and a polymer blend, wherein said polymer blend comprises:

a. a first polymer which is carboxylated poly(vinyl chloride) or poly(vinyl chloride), wherein the molecular weight of said first polymer is from 100,000 to 500,000, and b. a second polymer, which is a co-polymer of vinyl chloride and at least one further monomer group having a hydrophilic group, wherein the molecular weight of said second polymer is below 100,000, wherein, if said first polymer is carboxylated poly(vinyl chloride), said second polymer has more hydrophilic groups than said first polymer.

In one embodiment, said first polymer is carboxylated poly(vinyl chloride). In a further embodiment, said first polymer is carboxylated poly(vinyl chloride) and said second polymer has at least 1.5-fold more hydrophilic groups than said first polymer, such as at least 2-fold, e.g. at least 4-fold, such as at least 5-fold, e.g. at least 10-fold more hydrophilic groups than said first polymer. In an even further embodiment, said first polymer is carboxylated poly(vinyl chloride) and said carboxylated poly(vinyl chloride) is between 0.1% and 10% carboxylated, e.g. between 0.5% and 5% carboxylated, such as between 1% and 3% carboxylated, e.g. 1.8% carboxylated.

In another embodiment, said first polymer is poly(vinyl chloride).

In one embodiment, the molecular weight of said first polymer is at least 110,000, e.g. at least 120,000, such as between 130,000 and 400,000, e.g. between 130,000 and 300,000, e.g. between 130,000 and 250,000.

In one embodiment, said first polymer is carboxylated poly(vinyl chloride) and the molecular weight of said first polymer is at least 110,000, e.g. at least 120,000, such as between 130,000 and 400,000, e.g. between 200,000 and 300,000, e.g. between 200,000 and 250,000, e.g. 220,000.

In another embodiment, said first polymer is poly(vinyl chloride) and the molecular weight of said first polymer is at least 110,000, e.g. at least 120,000, such as between 120,000 and 200,000, e.g. between 130,000 and 160,000, e.g. 140,000.

In one embodiment of the membrane of the invention, said further monomer in the second polymer is vinyl alcohol, a vinyl ester or a hydroxy-functional acrylate. In a further embodiment, said second polymer is a co-polymer of vinyl chloride, vinyl acetate, vinyl alcohol and, optionally, a further monomer comprising a hydrophilic group, such as acrylic acid, methacrylic acid or maleic acid.

In an even further embodiment, said second polymer is poly(vinyl chloride-co-vinyl acetate-co-vinyl alcohol). In one embodiment, said poly(vinyl chloride-co-vinyl acetate-co-vinyl alcohol) comprises between 75% and 98% vinyl chloride, such as between 85% and 95% vinyl chloride, e.g. between 89% and 93% vinyl chloride, such as 91% vinyl chloride. In another embodiment, said poly(vinyl chloride-co-vinyl acetate-co-vinyl alcohol) comprises between 1% and 20% vinyl acetate, such as between 1% and 10% vinyl acetate, e.g. between 1% and 5% vinyl acetate, such as 3% vinyl acetate. In a further embodiment, said poly(vinyl chloride-co-vinyl acetate-co-vinyl alcohol) comprises between 1% and 15% vinyl alcohol, such as between 1% and 10% vinyl alcohol, e.g. between 4% and 8% vinyl alcohol, such as 6% vinyl alcohol.

In one embodiment, the molecular weight of the second polymer is less than 100,000, e.g. between 30,000 and 90,000, preferably between 60,000 and 80,000, such as 70,000.

In one embodiment, the ratio of the first polymer mass to the second polymer mass in the membrane is between 10:1 and 1:5, e.g. between 4:1 and 1:4, such as between 2:1 and 1:3, e.g. between 2:3 and 3:7, such as 1:2.

In one embodiment, said first polymer is carboxylated poly(vinyl chloride) and the ratio of the first polymer mass to the second polymer mass in the membrane is between 4:1 and 1:4, such as between 2:1 and 1:3, e.g. between 3:2 and 3:7, or between 2:3 and 3:7 such as 1:2.

In another embodiment, said first polymer is poly(vinyl chloride) and the ratio of the first polymer mass to the second polymer mass in the membrane is between 10:1 and 1:5, such as between 7:1 and 1:2, e.g. between 5:1 and 1:2, such as between 5:1 and 2:3, e.g. between 5:1 and 2:1, such as 4:1.

In one embodiment, the polymer blend constitutes about 10% to 50% of the dry membrane mass (i.e. the mass of the components before mixing in solvent), e.g. between 20% and 40% of the dry membrane mass, such as between 25% and 35% of the dry membrane mass, e.g. between 25% and 30% of the dry membrane mass.

Ionophores

As described above, the membrane of the invention comprises an ionophore or a mixture of ionophores. In one embodiment, the ionophore is selective for magnesium ions, calcium ions, sodium ions, potassium ions, lithium ions, zinc ions or phosphate ions. In a preferred embodiment, the ionophore is a magnesium ion selective ionophore.

The ionophore used in the membrane of the invention may be charged or not charged (neutral). In some embodiments, the ionophore is lipophilic.

In a preferred embodiment, the ionophore is a phenanthroline compound which is 1,10-phenanthroline or a substituted form thereof. Such compounds have e.g. been described in WO92/16831 (Nova Biomedical Corp.). 1,10-phenanthroline has the following structure:

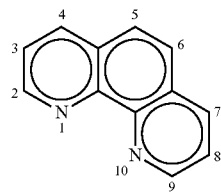

In one embodiment, the carbon atoms at positions 2 and 9 of the phenanthroline compound are bonded to a hydrogen.

In one embodiment, the ionophore is a compound of the Formula II:

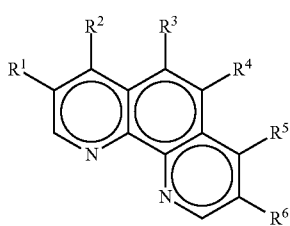

wherein each of $R^1$-$R^6$ is any of:
H;
any of F, Cl, Br, I, $NO_2$, CN, or $CF_3$;
$C_{1-18}$ alkyl;
$C_{1-18}$ aryl;
$C_{1-18}$ alkenyl;

$(CH_2)_mY$, wherein m is 0 or an integer from 1 to 4, Y is any of —$OR^7$, —$NR^7R^8$, —$OCOR^7$, —$NR^7COR^8$, —$COR^7$, —$COOR^7$, —$SO_3R^7$, —$OSiR^7R^8R^9$, —$PO_4R^7R^8$, —$PO_3R^7R^8$, wherein each of $R^7$, $R^8$, and $R^9$ are any of H, alkyl, branched alkyl, aryl, or substituted aryl; or $C_n$—$R^{10}R^{11}$, wherein n is 0 or an integer between 1 and 17 inclusive, $R^{10}$ is C, N, NCO, or $CH_2$—Z—$CH_2$ wherein Z is any of 0, NH, S, OCO, or CO, $R^{11}$ is a compound of the Formula III:

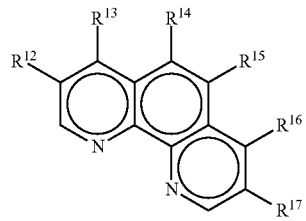

and $R^{11}$ is linked to $R^{10}$ at any of positions 3, 4, 5, 6, 7, or 8 of $R^{11}$, $R^{12}$-$R^{17}$ are any of H, $C_{1-18}$ alkyl, $C_{1-18}$ aryl, or deleted, provided that if $R^{11}$ is linked to $R^{10}$ at position 3 of $R^{11}$ then $R^{12}$ is deleted, if $R^{11}$ is linked to $R^{10}$ at position 4 of $R^{11}$ then $R^{13}$ is deleted, if $R^{11}$ is linked to $R^{10}$ at position 5 of $R^{11}$ then $R^{14}$ is deleted, if $R^{11}$ is linked to $R^{10}$ at position 6 of $R^{11}$ then $R^{15}$ is deleted, if $R^{11}$ is linked to $R^{10}$ at position 7 of $R^{11}$ then $R^{16}$ is deleted, if $R^{11}$ is linked to $R^{10}$ at position 8 of $R^{11}$ then $R^{17}$ is deleted, provided that one of $R^1$-$R^6$ is other than H and that each of the C atoms at positions 2 and 9 of the 1,10-phenanthroline is bonded, by the bond which does not participate in the fused ring structure, to an H.

In a further embodiment, $R^1$ to $R^6$ include a total of at least 6 carbon atoms, e.g. 6, 7, 8, 9 10 or 11 carbon atoms, such as a total of at least 11 carbon atoms, e.g. between 11 and 18 carbon atoms.

In another embodiment, one or more of $R^1$, $R^2$, $R^3$, $R^4$, $R^5$ and $R^6$ is an alkyl or aryl group having between 1 and 18 carbon atoms. For example, one or two groups selected from $R^1$, $R^2$, $R^3$, $R^4$, $R^5$ and $R^6$ may be an alkyl or aryl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl or aryl groups having between 1 and 18 carbon atoms and the other groups are hydrogen.

In another embodiment, one or more of $R^1$, $R^2$, $R^3$, $R^4$, $R^5$ and $R^6$ is an alkyl group having between 1 and 18 carbon atoms. For example, one or two groups selected from $R^1$, $R^2$, $R^3$, $R^4$, $R^5$ and $R^6$ may be an alkyl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl groups having between 1 and 18 carbon atoms and the other R groups are hydrogen.

In another embodiment, one or more of $R^1$, $R^2$, $R^3$, $R^4$, $R^5$ and $R^6$ is an alkyl group having between 6 and 18 carbon atoms. For example, one or two groups selected from $R^1$, $R^2$, $R^3$, $R^4$, $R^5$ and $R^6$ may be an alkyl group having between 6 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl groups having between 6 and 18 carbon atoms and the others are hydrogen.

In another embodiment, only one of $R^1$, $R^2$, $R^3$, $R^4$, $R^5$ and $R^6$ is an alkyl group having between 1 and 18 carbon atoms, such as between 6 and 18 carbon atoms, e.g. between 11 and 18 carbon atoms and the other R groups are hydrogen.

In another embodiment, $R^2$ and/or $R^5$ is an alkyl group having between 1 and 18 carbon atoms, such as between 6 and 18 carbon atoms, e.g. between 11 and 18 carbon atoms and the other R groups are hydrogen. In another embodiment, $R^2$ and/or $R^5$ is an aryl group having between 1 and 18 carbon atoms.

In a preferred embodiment, the ionophore is 4-undecyl-1,10-phenanthroline or 4,7-diundecyl-1,10-phenanthroline.

Substituted 1,10-phenanthroline compounds may be synthesized by standard techniques known to those skilled in the art. For example, the synthesis of 4- and 4,7-substituted 1,10-phenanthrolines are described in Lund et al., J. Chem. Eng. Data, 26: 227-29 (1981), hereby incorporated by reference. Methyl groups can provide a handle for the attachment of the desired side-chain in the synthesis of other 1,10-phenanthroline derivatives, and methyl substituted 1,10-phenanthrolines are commercially available. For example, 4-methyl, 5-methyl, 6-methyl, 7-methyl, 3,6-dimethyl, 5,7-dimethyl, 4,7-dimethyl, and 5,6-dimethyl-1,10-phenanthroline are all available from Aldrich Chemical Co. 4-undecyl-1,10-phenanthroline and 4,7-diundecyl-1,10-phenanthroline may e.g. be synthesized as described in WO92/16831 (Nova Biomedical Corp.).

In another embodiment, the magnesium ion selective membrane comprises an ionophore having a tripodal stereochemical structure, e.g. a tripodal structure such as the ones described in WO2015/160755 (Siemens Healthcare Diagnostics Inc.).

Thus, in one embodiment, the ionophore is a compound according to Formula IV (also termed ETH5506 in the art):

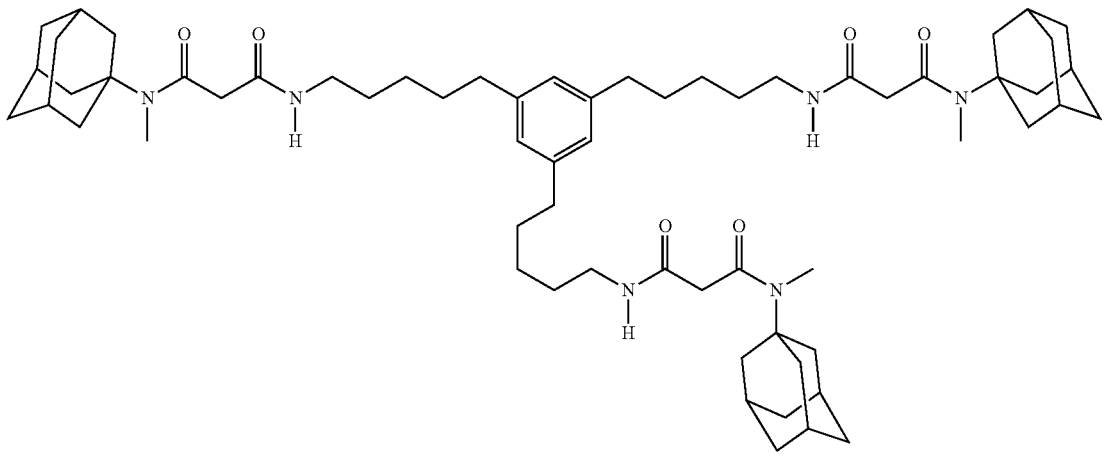 [SMILES: CN(C(=O)CC(=O)NCCCCCc1cc(CCCCCNC(=O)CC(=O)N(C)C23CC4CC(CC(C4)C2)C3)cc(CCCCCNC(=O)CC(=O)N(C)C23CC4CC(CC(C4)C2)C3)c1)C12CC3CC(CC(C3)C1)C2]

In another embodiment, the ionophore is a compound according to Formula V (also termed ETH5504 in the art):

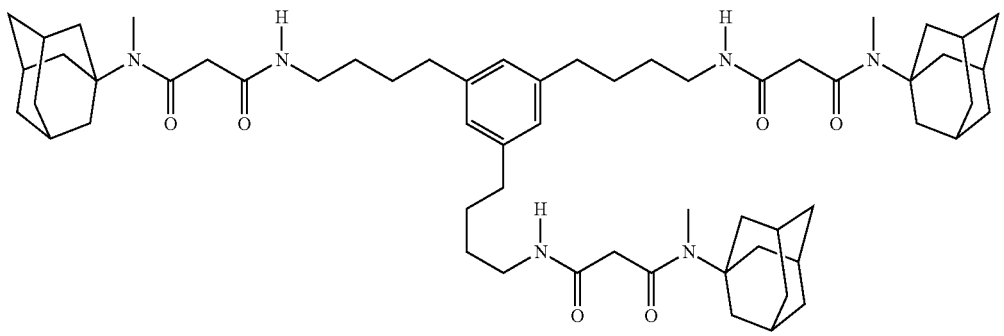 [SMILES: CN(C(=O)CC(=O)NCCCCc1cc(CCCCNC(=O)CC(=O)N(C)C23CC4CC(CC(C4)C2)C3)cc(CCCCNC(=O)CC(=O)N(C)C23CC4CC(CC(C4)C2)C3)c1)C12CC3CC(CC(C3)C1)C2]

In another embodiment, the ionophore is a compound according to Formula VI (also termed ETH3832 in the art):

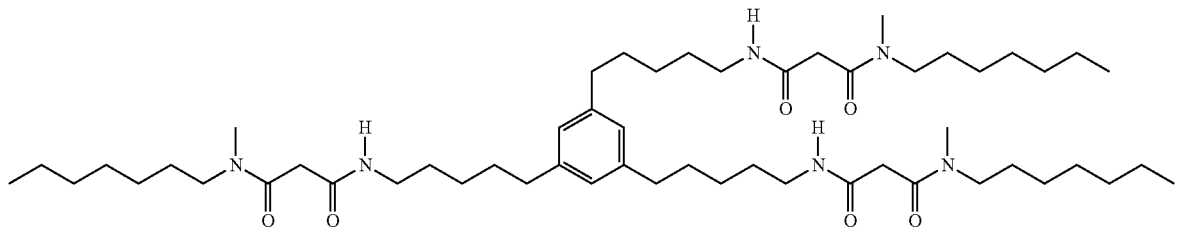 [SMILES: CCCCCCCN(C)C(=O)CC(=O)NCCCCCc1cc(CCCCCNC(=O)CC(=O)N(C)CCCCCCC)cc(CCCCCNC(=O)CC(=O)N(C)CCCCCCC)c1]

In another embodiment, the ionophore is a compound according to Formula VII, wherein n is an integer from 6 to 8 (termed ETH5282 in the art when n is 6; termed ETH7025 in the art when n is 8):

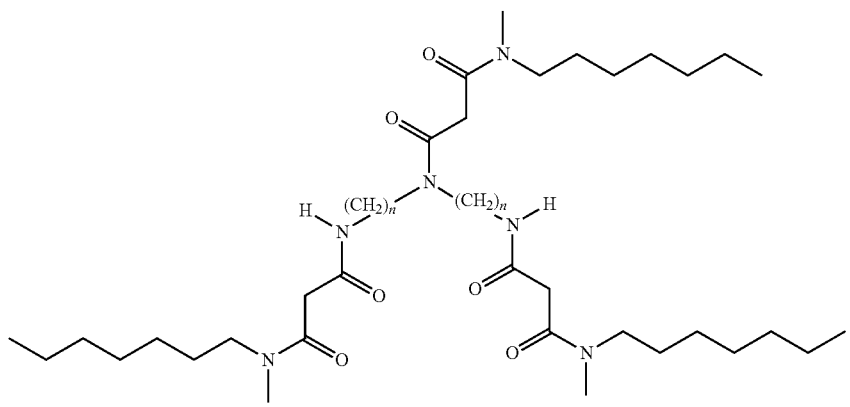

In another embodiment, the ionophore is one of the ionophores described in Table 8 of IUPAC 2000 Part I Inorganic cations Pure Appl Chem 72:1851, e.g. $Mg^{2+}$-1, $Mg^{2+}$-2, $Mg^{2+}$-3, $Mg^{2+}$-4, $Mg^{2+}$-5, $Mg^{2+}$-6, $Mg^{2+}$-7, $Mg^{2+}$-8, $Mg^{2+}$-9, $Mg^{2+}$-10, $Mg^{2+}$-11, $Mg^{2+}$-12, $Mg^{2+}$-13, $Mg^{2+}$-14, $Mg^{2+}$-15, $Mg^{2+}$-16, $Mg^{2+}$-17, $Mg^{2+}$-18, $Mg^{2+}$-19, $Mg^{2+}$-20, $Mg^{2+}$-21, $Mg^{2+}$-22, $Mg^{2+}$-23, $Mg^{2+}$-24, $Mg^{2+}$-25, $Mg^{2+}$-26, $Mg^{2+}$-27, $Mg^{2+}$-28, $Mg^{2+}$-29, $Mg^{2+}$-30, $Mg^{2+}$-31, $Mg^{2+}$-32, $Mg^{2+}$-33, $Mg^{2+}$-34, $Mg^{2+}$-35, $Mg^{2+}$-36, $Mg^{2+}$-37, $Mg^{2+}$-38, $Mg^{2+}$-39, $Mg^{2+}$-40, $Mg^{2+}$-41, $Mg^{2+}$-42, $Mg^{2+}$-43, $Mg^{2+}$-44, $Mg^{2+}$-45, $Mg^{2+}$-46, $Mg^{2+}$-47, $Mg^{2+}$-48, $Mg^{2+}$-49, $Mg^{2+}$-50, $Mg^{2+}$-51, $Mg^{2+}$-52, $Mg^{2+}$-53, $Mg^{2+}$-54, $Mg^{2+}$-55 or $Mg^{2+}$-56.

In another embodiment, the ionophore is one of the ionophores described in Buhlmann et al. (1998) Chem. Rev. 98:1593, e.g. $Mg^{2+}$-1, $Mg^{2+}$-2 $Mg^{2+}$-3, $Mg^{2+}$-4, $Mg^{2+}$-5, $Mg^{2+}$-6, $Mg^{2+}$-7, $Mg^{2+}$-8, $Mg^{2+}$-9, $Mg^{2+}$-10, $Mg^{2+}$-11, $Mg^{2+}$-12, $Mg^{2+}$-13, $Mg^{2+}$-14, $Mg^{2+}$-15 or $Mg^{2+}$-16.

In another embodiment, the ionophore is ETH 5220 (Zhang et al. (2011) Am. J. Biomed. Sci. 3:301) or ETH 2001, ETH 2002, ETH 2003 or ETH 2022 (Zhang et al. (2000) Anal. Sci. 16:11).

In another embodiment, the ionophore is ETH 1001, DBM, ETH 1117, cyclo(LPro-DLeu)$_5$, ETH 1224, ETH 2220, ETH 4030, ETH 5214, ETH 5282 or ETH 7025, all described in Spichiger (1993) Electroanalysis 5: 739.

In another embodiment, the ionophore is one of the ionophores described in Suzuki et al. (1995) Anal. Chem. 67:324 (herein incorporated by reference), preferably K22B5, an 18-membered diaza-crown having two malonamide side chains with an adamantyl group, or a variant thereof, such as K22B1B5 (Siswanta et al. (1997) Anal. Sci. 13:429.

In a preferred embodiment, the ionophore is 1,2-bis (diarylphosphine oxide)benzene (Saleh (1994) J. Electroanalytical Chem. 373:89) or methyl phenyl semicarbazone (Chandra et al. (2013) J. Chem., http://dx.doi.org/10.1155/2013/189464).

Lipophilic Compounds

In one embodiment, the membrane of the invention further comprises a lipophilic compound comprising an acidic group, such as a lipophilic salt.

In a preferred embodiment, the lipophilic compound comprises a compound of the formula I:

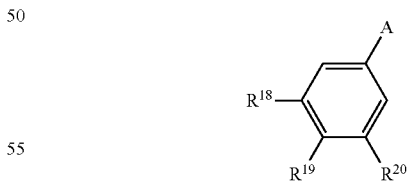

wherein A comprises an acidic group,
wherein one, two or all three of $R^{18}$, $R^{19}$ and $R^{20}$ is a $C_{4-18}$ group, which is a $C_{4-18}$alkyl group, a $C_{4-18}$alkenyl group, a $C_{4-18}$alkynyl group, or an amide-containing $C_{4-18}$ group, wherein said $C_{4-18}$ group is linear at positions 1, 2 and 3, counting from the phenyl group, or in total only has one side chain at said positions 1, 2 and 3,
and wherein the others of $R^{18}$, $R^{19}$ and $R^{20}$ independently are hydrogen, or a linear $C_{1-18}$ alkyl group
or a salt of said lipophilic compound.

For the avoidance of doubt, the phrase "or in total only has one side chain at said positions 1, 2, and 3" herein means that each $C_{4-18}$ group in total only has one side-chain at said positions 1, 2, 3. Thus, in embodiments where two or more of $R^{18}$, $R^{19}$ and $R^{20}$ are $C_{4-18}$ groups, two or more of these $C_{4-18}$ groups may have one side-chain at position 1, 2 or 3.

For illustration, the following formula shows an embodiment wherein $R^{18}$ and $R^{20}$ are hydrogen and $R^{19}$ is a linear $C_8$ alkyl group without side chain. Positions 1, 2 and 3 are indicated:

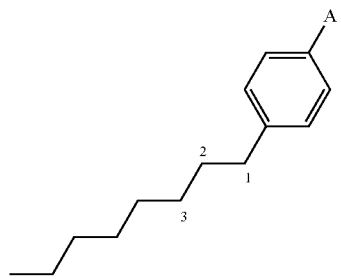

In one embodiment, the acidic group comprised within group A of formula I is a carboxylic acid, a sulfonic acid, a sulfuric acid monoester, a sulfonamide, a phosphonic acid, a phosphoric acid, an arsenic acid, a sulfinic acid or a thiocarboxylic acid.

In one embodiment, the acidic group comprised within group A of formula I is a carboxylic acid. For example, group A may be a carboxylic acid group according to formula IX, a carbonic acid group according to formula X, an oxalic acid monoester group according to formula XI or a dicarboxylic acid monoester group according to formula XII:

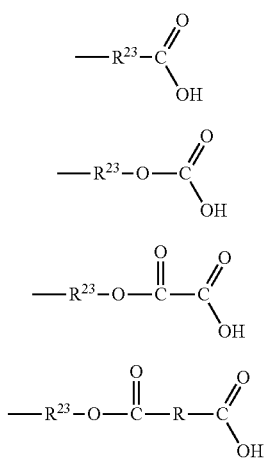

Formula IX

Formula X

Formula XI

Formula XII $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula IX, $R^{23}$ is absent and thus group A consists of a carboxylic acid group. $R^{24}$ in formula IX may be a $C_{1-5}$ group, e.g. a $C_{1-5}$ alkyl group, a $C_{1-5}$alkenyl group, a $C_{1-5}$alkynyl group, or an amide-containing $C_{1-5}$ group.

In another embodiment, the acidic group comprised within group A is a sulfonic acid. For example, group A may be a sulfonic acid group according to formula XIII:

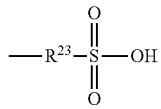

Formula XIII $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XIII, $R^{23}$ is absent and thus group A consists of a sulfonic acid group.

In another embodiment, the acidic group comprised within group A is a sulfuric acid monoester. For example, group A may be a sulfuric acid monoester group according to formula XIV:

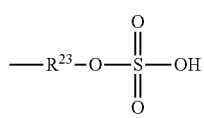

Formula XIV $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XIV, $R^{23}$ is absent and thus group A consists of a sulfuric acid monoester group.

In another embodiment, the acidic group comprised within group A is a sulfonamide. For example, group A may be a sulfonamide group according to formula XV:

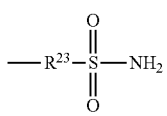

Formula XV $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XV, $R^{23}$ is absent and thus group A consists of a sulfonamide group.

In another embodiment, the acidic group comprised within group A is a phosphonic acid. For example, group A may be a phosphonic acid group according to formula XVI or a phosphonic acid monoester group according to formula XVII:

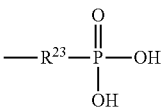

Formula XVI

-continued

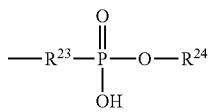
Formula XVII $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XVI, $R^{23}$ is absent and thus group A consists of a phosphonic acid group. $R^{24}$ may be a $C_{1-18}$ group e.g. a $C_{1-18}$alkyl group, a $C_{1-18}$alkenyl group, a $C_{1-18}$alkynyl group, an amide-containing $C_{1-18}$ group, or an aryl group. In particular the aryl group may be a phenyl group, e.g. $R^{24}$ may be a phenyl group having substituents $R^{18}$, $R^{19}$ and $R^{20}$, as defined in formula I.

In another embodiment, the acidic group comprised within group A is a phosphoric acid. For example, group A may be a phosphoric acid monoester group according to formula XVIII or a phosphoric acid diester group according to formula XIX, or a polyphosphoric acid group according to formula XX:

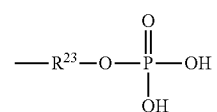
Formula XVIII

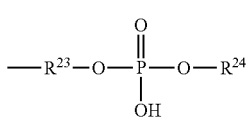
Formula XIX

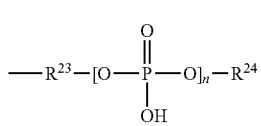
Formula XX $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XVIII, $R^{23}$ is absent and thus group A consists of a phosphoric acid monoester group. In one embodiment of the compound according to formula XIX, $R^{23}$ is absent and thus group A consists of a phosphoric acid diester group. $R^{24}$ may be a $C_{1-18}$ group e.g. a $C_{1-18}$alkyl group, a $C_{1-18}$alkenyl group, a $C_{1-18}$alkynyl group, an amide-containing $C_{1-18}$ group, or an aryl group. In particular the aryl group may be a phenyl group, e.g. $R^{24}$ may be a phenyl group having substituents $R^{18}$, $R^{19}$ and $R^{20}$, as defined in formula I.

In another embodiment, the acidic group comprised within group A is an arsenic acid. For example, group A may be a group according to formula XVI, XVII, XIII, XIX or XX, wherein the phosphorus atom has been replaced by an arsenic atom (As).

In another embodiment, the acidic group comprised within group A is a sulfinic acid. For example, group A may be a sulfinic acid group according to formula XXI:

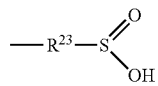
Formula XXI $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XXI, $R^{23}$ is absent and thus group A consists of a sulfinic acid group.

In another embodiment, the acidic group comprised within group A is a thiocarboxylic acid. For example, group A may be a thiocarboxylic acid group according to formula XXII or formula XXIII:

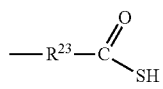
Formula XXII

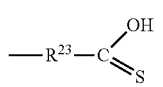
Formula XXIII $R^{23}$ may be a $C_{1-5}$ group, e.g. a $C_{1-5}$ alkyl group, a $C_{1-5}$alkenyl group, a $C_{1-5}$alkynyl group, or an amide-containing $C_{1-5}$ group, or $R^{23}$ may be absent. Preferably $R^{23}$ is linear. E.g. in one embodiment of the compound according to formula XXII or formula XXIII, $R^{23}$ is absent and thus group A consists of a thiocarboxylic acid group.

In one embodiment, group A of formula I is phosphoric acid mono- or diester group, e.g. a group —$R^{23}$—(HPO$_4$)—$R^{24}$ according to formula XIX, wherein $R^{23}$ is absent or an alkyl (e.g. $C_{1-18}$ alkyl), branched alkyl, aryl, or substituted aryl, and $R^{24}$ is hydrogen or an alkyl (e.g. $C_{1-18}$alkyl), branched alkyl, aryl, or substituted aryl.

In a further embodiment, the lipophilic salt(s) comprise(s) a compound of the Formula VIII:

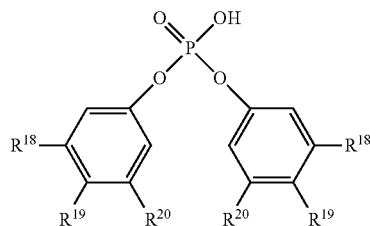

wherein $R^{18}$, $R^{19}$ and $R^{20}$ are as defined for Formula I. Preferably, the membrane comprises a salt of the lipophilic compound of Formula VIII.

In one embodiment, one of $R^{18}$, $R^{19}$ or $R^{20}$ is a $C_{4-18}$ alkyl group as defined above (i.e. a $C_{4-18}$alkyl group which is linear at positions 1, 2 and 3, counting from the phenyl group, or in total only has one side chain at said positions 1, 2 and 3), and the others are, independently, hydrogen or a linear $C_{1-18}$ alkyl group.

In a further embodiment, one of $R^{18}$, $R^{19}$ or $R^{20}$ is a $C_{4-18}$alkyl group as defined above and the others are hydrogen. In a further embodiment, $R^{19}$ is a $C_{4-18}$alkyl group as defined above and $R^{18}$ and $R^{20}$ are hydrogen.

In one embodiment, said $C_{4-18}$alkyl group(s) is/are linear. In another embodiment, said $C_{4-18}$alkyl group(s) comprise(s) at least 6, such as at least 8 carbon atoms, e.g. 8, 9, 10, 11 or 12 carbon atoms.

In a further embodiment, only one of $R^{18}$, $R^{19}$ or $R^{20}$ is a $C_{4-18}$alkyl group, and said $C_{4-18}$alkyl group comprises at least 6, such as at least 8 carbon atoms, e.g. 8, 9, 10, 11 or 12 carbon atoms.

In a preferred embodiment, the lipophilic salt(s) comprise(s) a compound of the formula VIII wherein $R^{18}$ and $R^{20}$ are hydrogen and $R^{19}$ is an octyl group.

Preferred salts are magnesium salt and calcium salts.

In a preferred embodiment, the lipophilic salt defined in b) is hemi-magnesium bis[4-octylphenyl]phosphate and the lipophilic salt defined in c) is hemi-calcium bis[4-octylphenyl]phosphate.

In another preferred embodiment, the lipophilic salt defined in b) is hemi-magnesium bis[4-(1,1,3,3-tetramethylbutyl)phenyl]phosphate and the lipophilic salt defined in c) is hemi-calcium bis[4-(1,1,3,3-tetramethylbutyl)phenyl]phosphate.

Lipophilic salts, such as hemi-calcium bis[4-octylphenyl]phosphate and hemi-magnesium bis[4-octylphenyl]phosphate, may be prepared by standard methods known in the art.

In a preferred embodiment, the lipophilic salts are hemi-magnesium bis[4-octylphenyl]phosphate (b)) and hemi-calcium bis[4-octylphenyl]phosphate (c)), wherein the mixture contains at least 50% hemi-magnesium bis[4-octylphenyl]phosphate, such as at least 80% hemi-magnesium bis[4-octylphenyl]phosphate, e.g. between 80% and 90% hemi-magnesium bis[4-octylphenyl]phosphate.

In a further preferred embodiment of the ion selective membrane of the invention, the ionophore is 4,7-diundecyl-1,10-phenanthroline and the lipophilic salts are hemi-magnesium bis[4-octylphenyl]phosphate and hemi-calcium bis[4-octylphenyl]phosphate.

In a preferred embodiment, the molar ratio between the ionophore and the lipophilic compound or the anion(s) of the lipophilic salt(s) s is between 2:1 and 1:1, such as a molar ratio between 1.8:1 and 1.2:1.

Besides the lipophilic compounds and lipophilic salts mentioned above, further salts may be present in the membrane of the invention. Thus, in embodiment, the membrane of the invention comprises a further salt, such as tetrakis(4-chlorophenyl)borate salt.

Ionophores Comprising a Covalently Linked Acidic Group

In a further embodiment, the ionophore and the acidic group are covalently linked rather than part of separate compounds.

Accordingly, in one embodiment, the invention relates to a magnesium ion selective membrane comprising an ionophore covalently linked to an acidic group via a spacer, wherein said spacer comprises at least one carbon atom or a salt thereof, i.e. a salt of said ionophore covalently linked to an acidic group via a spacer. In a preferred embodiment, the ionophore is lipophilic.

In one embodiment, said spacer is an alkyl group, such as a linear or branched alkyl group having a total of from 1 to 18 carbon atoms, wherein the alkyl group optionally is substituted. In another embodiment, said spacer a linear alkyl group, e.g. a $-(CH_2)_n-$ group, wherein n is at least 1, such as 1, 2, 3, 4 or 5, or at least 2.

In one embodiment, said ionophore is a phenanthroline compound which is 1,10-phenanthroline or a substituted form thereof. In one embodiment hereof, the spacer is covalently linked to the phenanthroline compound at the carbon atom at position 2, 3, 4, 5, 6, 7, 8 or 9 of 1,10-phenanthroline.

In a further embodiment, the ionophore covalently linked to an acidic group via a spacer (wherein said spacer comprises at least one carbon atom) is a phenanthroline compound of the formula II:

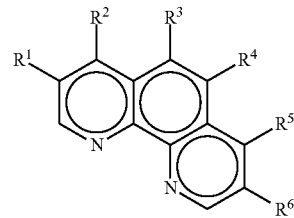

wherein each of $R^1$-$R^6$ is any of:
H;
any of F, Cl, Br, I, $NO_2$, CN, or $CF_3$;
$C_{1-18}$ alkyl;
$C_{1-18}$ aryl;
$C_{1-18}$ alkenyl;
$(CH_2)_m Y$, wherein m is 0 or an integer from 1 to 4, Y is any of $-OR^7$, $-NR^7R^8$, $-OCOR^7$, $-NR^7COR^8$, $-COR^7$, $-COOR^7$, $-SO_3R^7$, $-OSiR^7R^8R^9$, $-PO_4R^7R^8$, $-PO_3R^7R^8$, wherein each of $R^7$, $R^8$, and $R^9$ are any of H, alkyl, branched alkyl, aryl, or substituted aryl;
$C_n-R^{10}R^{11}$, wherein n is 0 or an integer between 1 and 17 inclusive, $R^{10}$ is C, N, NCO, or $CH_2-Z-CH_2$ wherein Z is any of O, NH, S, OCO, or CO, $R^{11}$ is

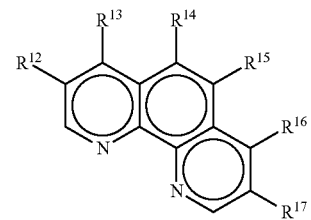

and $R^{11}$ is linked to $R^{10}$ at any of positions 3, 4, 5, 6, 7, or 8 of $R^{11}$, $R^{12}$-$R^{17}$ are any of H, $C_{1-18}$ alkyl, $C_{1-18}$ aryl, or deleted, provided that if $R^{11}$ is linked to $R^{10}$ at position 3 of $R^{11}$ then $R^{12}$ is deleted, if $R^{11}$ is linked to $R^{10}$ at position 4 of $R^{11}$ then $R^{13}$ is deleted, if $R^{11}$ is linked to $R^{10}$ at position 5 of $R^{11}$ then $R^{14}$ is deleted, if $R^{11}$ is linked to $R^{10}$ at position 6 of $R^{11}$ then $R^{15}$ is deleted, if $R^{11}$ is linked to $R^{10}$ at position 7 of $R^{11}$ then $R^{16}$ is deleted, if $R^{11}$ is linked to $R^{10}$ at position 8 of $R^{11}$ then $R^{17}$ is deleted;
provided that one of $R^1$-$R^6$ is other than H and that each of the C atoms at positions 2 and 9 of the 1,10-phenanthroline is bonded, by the bond which does not participate in the fused ring structure, to an H,
and wherein one of $R^1$ to $R^6$ comprises the spacer and the acidic group, preferably wherein $R^1$ or $R^6$ comprises the spacer and the acidic group.

In a further embodiment hereof, $R^1$ to $R^6$ include a total of at least 6 carbon atoms, e.g. 6, 7, 8, 9 10 or 11 carbon atoms, such as a total of at least 11 carbon atoms, e.g. between 11 and 18 carbon atoms.

In another embodiment, one or more of $R^1$, $R^2$, $R^3$, $R^4$, $R^5$ and $R^6$ is an alkyl or aryl group having between 1 and 18 carbon atoms. For example, one or two groups selected from $R^1$, $R^2$, $R^3$, $R^4$, $R^5$ and $R^6$ may be an alkyl or aryl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl or aryl groups having between 1 and 18 carbon atoms and the others are hydrogen.

In another embodiment, one or more of $R^1$, $R^2$, $R^3$, $R^4$, $R^5$ and $R^6$ is an alkyl group having between 1 and 18 carbon atoms. For example, one or two groups selected from $R^1$, $R^2$, $R^3$, $R^4$, $R^5$ and $R^6$ may be an alkyl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and R, $R^4$ and $R^6$ or $R^5$ and $R^6$ are alkyl groups having between 1 and 18 carbon atoms and the others are hydrogen.

In another embodiment, one or more of $R^1$, $R^2$, $R^3$, $R^4$, $R^5$ and $R^6$ is an alkyl group having between 6 and 18 carbon atoms. For example, one or two groups selected from $R^1$, $R^2$, $R^3$, $R^4$, $R^5$ and $R^6$ may be an alkyl group having between 6 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and R, $R^4$ and $R^6$ or $R^5$ and $R^6$ are alkyl groups having between 6 and 18 carbon atoms and the others are hydrogen.

In another embodiment, one of $R^1$, $R^2$, $R^3$, $R^4$, $R^5$ and $R^6$ is an alkyl group having between 1 and 18 carbon atoms, such as between 6 and 18 carbon atoms, e.g. between 11 and 18 carbon atoms.

In another embodiment, $R^2$ and/or $R^5$ is an alkyl group having between 1 and 18 carbon atoms, such as between 6 and 18 carbon atoms, e.g. between 11 and 18 carbon atoms.

In another embodiment, $R^2$ and/or $R^5$ is an aryl group having between 1 and 18 carbon atoms.

In a preferred embodiment, the phenanthroline compound is 4-undecyl-1,10-phenanthroline covalently linked to an acidic group via a spacer, wherein said spacer comprises at least one carbon atom, such as two or three carbon atoms.

In another preferred embodiment, the phenanthroline compound is 4,7-diundecyl-1,10-phenanthroline covalently linked to an acidic group via a spacer, wherein said spacer comprises at least one carbon atom.

Preferably, the spacer comprises 1 to 18 carbon atoms. In one embodiment, the spacer comprises at least 2, such as at least 3 carbon atoms, and the spacer is covalently linked at position 2, 3, 4, 5, 6, 7, 8 or 9 of the 1,10-phenanthroline compound.

In one embodiment, the acidic group is selected from the group consisting of: a carboxylic acid, a sulfonic acid, a sulfuric acid monoester, a sulfonamide, a phosphonic acid, a phosphoric acid, an arsenic acid, a sulfinic acid or a thiocarboxylic acid.

In a preferred embodiment, the acidic group is —(HPO$_4$)$R^7$, —(HPO$_3$)$R^7$, wherein $R^7$ is H, alkyl, branched alkyl, aryl, or substituted aryl, e.g. 4-octylphenyl.

In another embodiment, the ionophore has a tripodal stereochemical structure, such as one of the structures depicted in Formulas IV, V, VI and VII. In one further embodiment hereof, the acidic group is positioned distal of the malondiamide group on one, two or three arms of the structure depicted in Formula IV, V, VI or VII. "Distal" in this context means distal relative to the center of the tripodal structure. Preferably, only one arm of the molecule has a covalently bound acidic group. In another embodiment, in one of the three arms of the structure depicted in Formulas IV, V, VI or VII, the malondiamide group is partially or entirely replaced by the acidic group.

Plasticizers—The membrane of the invention typically further comprises a plasticizer. The role of the plasticizer is to keep other components, such as the ionophore, solvated. Many suitable plasticizers, e.g. esters, phosphonates and ethers, have been described in the art. In one embodiment, the plasticizer has a LogP value of at least 5. In one embodiment, the plasticizer is 4-hexylphenyl 2-nitrophenyl ether (NHPE), 2-nitrophenyl octyl ether (NPOE), 2-nitrophenyl decyl ether (NPDE), 2-nitrophenyl undecyl ether (NPUDE), 2-nitrophenyl dodecyl ether (ETH 217), 2-nitrophenyl tetradecyl ether (NPTDE) or [12-(4-ethylphenyl)dodecyl] 2-nitrophenyl ether (ETH 8045) or a mixture of any of these. In a preferred embodiment, the plasticizer is 4-hexylphenyl 2-nitrophenyl ether (NHPE).

In one embodiment, the ratio of the plasticizer mass to the total mass of polymer is between 1:1.5 and 4:1, such as between 1:1 and 3:1, e.g. between 1.5:1 and 7:3, such as between 2.1:1 and 2:1.

In another embodiment, the ratio of the plasticizer mass to the total mass of the other components of the membrane is between 2:1 and 1:1, e.g. between 1.8:1 and 1.2:1, such as between 1.6:1 and 1.2:1, e.g. between 1.5:1 and 1.3:1.

In one embodiment, the plasticizer, such as NHPE, constitutes about 40% to 80% of the dry membrane mass, e.g. between 50% and 70% of the dry membrane mass, such as between 55% and 65% of the dry membrane mass.

In a preferred embodiment, the membrane has the composition specified in Table 1 below.

TABLE 1

Wet and dry mass composition of the mixed membrane solution.

| Component | Wet mass (%) | Dry mass (%) |
|---|---|---|
| Hemi-Mg-bis-[4-octylphenyl]phosphate | 1.49 | 4.58 |
| Hemi-Ca-bis-[4-octylphenyl]phosphate | 0.26 | 0.81 |
| 4,7-Diundecyl-1,10-phenanthroline (DUP) | 2.41 | 7.40 |
| 1.8% carboxylated PVC | 3.07 | 9.42 |
| PVC co-Polymer* | 6.15 | 18.89 |
| 4-hexylphenyl 2-nitrophenyl ether (NHPE) | 19.17 | 58.90 |
| Cyclohexanone, Sigma C102180 | 67.46 | |

*poly(vinyl chloride-co-vinyl acetate-co-vinyl alcohol) having a content of 91% vinyl chloride, 3% vinyl acetate and 6% vinyl alcohol.

Process for Preparing Membranes of the Invention

In a further aspect, the invention relates to a process for preparing an ion selective membrane of the invention by mixing the components in a solvent, dispensing the resulting solution on a desired support and allowing the solvent to evaporate. Any suitable solvent may be used. In one embodiment, the solvent is cyclohexanone. The support may be flexible or rigid. The support is preferably made of non-conducting material such as silicon, polymer, a printed circuit board (PCB), flex-PCB, polyethylene terephthalate (PET), polyimide (PI), ceramic, alumina, glass, wood product, frit, etc.

Electrodes and Potentiometric Sensors

In a further main aspect, the invention relates to an ion-selective electrode comprising the ion selective membrane of the invention as described herein. The electrode may be made on a support by using thick film approach e.g. screen printing, rotogravure, pad printing, stenciling conductive material such as carbon, Cu, Pt, Pd, Au, and/or nanotubes, etc. or by using thin film approach e.g. by sputtering, thermal spraying and/or cold spraying conductive material. The support may be flexible or rigid. The support is preferably made of non-conducting material such as silicon, polymer, a printed circuit board (PCB), flex-PCB, polyethylene terephthalate (PET), polyimide (PI), ceramic, alumina, glass, wood product, frit, etc.

In an even further main aspect, the invention relates to a sensor assembly where two or more analyte electrodes are present on a single support with or without a reference electrode (see e.g. U.S. Pat. No. 5,916,425 for a sensor assembly including a reference electrode). In some embodiments, the sensor assembly is made of two supports each comprising two or more analyte electrodes with or without a reference electrode. The supports may be placed in a layered structure on top of each other such that the surfaces of said supports with the electrodes are facing each other (see e.g. WO2008/131767). Alternative suitable sensor assemblies have been described in WO2018/112017, WO2018/112012, WO2018/112008, WO2017/120464, WO2017/019609, WO2016/106320, WO2016/011308, WO2016/007716 and WO2013/163120.

In one embodiment, the system is calibrated with calibrators containing physiological concentrations of potentially interfering compounds ($Ca^{2+}$, $K^+$ and $Na^+$).

In some embodiments, the system contains one or more electrodes for measurement of other cations, e.g. calcium ions, so that interference can be minimized by chemometric correction of the analyte signal based on measurements of the activity of the cations.

Uses and Methods of Use

As described above, in a further main aspect, the invention relates to the use of a potentiometric sensor or electrode according to the invention for the determination of the ion concentration in a sample.

Similarly, the invention relates to a method of determining the ion concentration of a liquid sample comprising contacting said sample with an electrode according to the invention or a potentiometric sensor according to the invention and determining the ion concentration based on signal provided by said electrode or potentiometric sensor.

A biological sample tested for the presence of an analyte may be a physiological fluid such as diluted or undiluted whole blood, serum, plasma, saliva, urine, feces, pleura, cerebrospinal fluid, synovial fluid, milk, ascites fluid, peritoneal fluid or amniotic fluid. Examples of other biological samples include fermentation broths, microbial cultures, waste water, food products and the like.

In a preferred embodiment, the sample is a blood sample or a serum sample. A sample, such as a blood sample, a serum sample, a plasma sample or a pleural sample can e.g. be a sample from a human subject.

As mentioned, in a preferred embodiment, the membrane is a magnesium ion selective membrane. The purpose of determining the magnesium ion levels may e.g. be to diagnose a disease or disorder in a patient, such as a human patient, or to monitor magnesium levels in a patient undergoing, or being enrolled for a treatment, such as medical therapy or surgery. In one embodiment, the disease or disorder is a cardiovascular disease or disorder. In another embodiment, the sample is a sample from a newborn, i.e. an infant of less than 28 days old.

Zhang (2011) *Am J Biomed Sci* 3:301 summarizes a number of studies which demonstrate an association between magnesium levels, in particular hypomagnesemia, and clinical outcomes. For example, studies have demonstrated association of hypomagnesemia and mortality rates in ICU patients experiencing hemodialysis, type 2 diabetes, cardiovascular diseases, or medical surgical intensive care. Furthermore, in heart disease patients, magnesium deficiency has been found to contribute to coronary vasospasm, arrhythmias, fibrillation, infarction, and sudden death. A study on magnesium intervention during cardiopulmonary bypass operations showed that intraoperative correction of iMg is associated with a reduction in postoperative ventricular arrhythmia and maintenance of an uninterrupted sinus rhythm. Clinical trial results also suggest a benefit for magnesium therapy for acute stroke patients in the ambulance or emergency department within the first two hours of the onset of stroke symptoms. Magnesium monitoring is also advocated in preeclampsia, a condition reported to be linked with hypomagnesemia and which occurs in 5-7% of pregnancies in Europe and the USA. Other findings have suggested that the ratio of iCa:iMg is a crucial diagnostic parameter for prevention of vascular and neurological complications in preeclampsia-eclampsia patients. Soliman et al. (2003) *Crit. Care Med.* 31:1082 reported a correlation between the onset of ionized hypomagnesemia during ICU stays and high morbidity and mortality rates.

Thus, in further embodiments, the sample in which the magnesium ion level is determined in the method or use according to the invention, may e.g. be a sample from a patient in acute admission or from a patient undergoing, or enrolled for, medical therapy or surgery, such as cardiac surgery, e.g. a cardiopulmonary bypass operation. In further embodiments, the sample is from a patient with poor food intake, a malabsorption disorder, hypokalemia, hypocalcemia, alcoholism or from a patient taking diuretics or other drugs associated with hypomagnesemia. In further embodiments, the sample is from a patient having renal disease, hypertension, preeclampsia, diabetes mellitus, diabetic ketoacidosis, arrhythmia, sepsis, chest pain, acute stroke, trauma chock, burns/smoke inhalation, acute lung diseases or a cardiac disease, such as cardiac arrest. In another embodiment, the patient is a patient at the maternity ward or a patient undergoing haemodialysis. Furthermore, the sample may be from an ICU patient experiencing hemodialysis, type 2 diabetes, cardiovascular diseases, or medical surgical intensive care.

The present invention is further illustrated by the following examples, which should not be construed as limiting the scope of the invention.

EXAMPLES

Example 1: Preparation of Ion Selective Membranes

A stock solution of hemi-magnesium bis[4-octylphenyl] phosphate (MgOPP) was prepared by mixing MgOPP and cyclohexanone (>99.8%) in a ratio of 48.28 grams of cyclohexanone per gram of MgOPP. The compounds were mixed at room temperature and subsequently stirred in the dark for a minimum of 8 hours at room temperature or stirred for a minimum of 4 hours at 37° C.

A membrane dispensing solution was prepared by mixing the following components:

| Compound | Quantity |
| --- | --- |
| hemi-calcium bis[4-octylphenyl]phosphate | 0.00263 ± 2% |
| 4,7-diundecyl-1,10-phenanthroline | 0.02410 ± 2% |
| carboxylated poly(vinyl chloride)-1.8% carboxyl basis-MW ~220,000 | 0.03073 ± 1.5% |
| Poly(vinyl chloride-co-vinyl acetate-co-vinyl alcohol)-PVC co-polymer containing 3% of vinyl acetate and 6% of vinyl alcohol-Mr ~24,500 (Fluka 27827) | 0.06148 ± 1.5% |
| 4-hexylphenyl 2-nitrophenyl ether (NHPE) | 0.19173 ± 1.5% |
| MgOPP stock solution in cyclohexanone | 0.68932 ± 0.5% |

The compounds were mixed in vials filled with argon or nitrogen gas at room temperature and subsequently stirred in the dark for a minimum of 40 hours at room temperature or stirred for a minimum of 16 hours at 37° C. The resulting solution was used for dispensing membranes onto a poly(3,4-ethylenedioxythiophene)-poly(styrenesulfonate)-(PEDOT-) covered gold electrode on a ceramic support. The solvent was subsequently allowed to evaporate to obtain the plasticized ion selective membrane.

Example 2: Effect of Polymer Composition on Membrane Integrity (Bleeding)

Four magnesium ion selective membranes, each having a different polymer composition, were prepared as indicated in the Table below. Membranes Mg616 and Mg626 contained 100% poly(vinyl chloride-co-vinyl acetate-co-vinyl alcohol) containing 3% of vinyl acetate and 60 of vinyl alcohol (CAS no. 25086-48-0). Membrane Mg616 contained the product SPPS64 from SP2. Membrane Mg626 contained product Fluka 27827 (Sigma-Aldrich, Selectophore™ grade). Membrane Mg652 was prepared using a polymer blend of poly(vinyl chloride) (PVC) (MW 140,000) and poly(vinyl chloride-co-vinyl acetate-co-vinyl alcohol) (Fluka 27827) in a 4:1 dry mass ratio. Membrane Mg654 was prepared using carboxylated poly(vinyl chloride) (cPVC) (carboxylated PVC—1.8% carboxyl basis) and poly(vinyl chloride-co-vinyl acetate-co-vinyl alcohol) (Fluka 27827)) in a 1:2 dry mass ratio.

| | 100% copolymer SPP064 | 100% copolymer 27827 | PVC: copolymer 278274:1 | cPVC: copolymer 278271:2 |
| --- | --- | --- | --- | --- |
| Membrane ID | mg616 | Mg626 | Mg652 | Mg654 |
| 4,7-diundecyl-1,10-phenantroline | 0.02410 g (±2%) | 0.02410 g (±2%) | 0.02410 g (±2%) | 0.02410 g (±2%) |
| Potassium tetrakis-(4-chlorophenyl) borate | 0.00536 g (±2%) | 0.00536 g (±2%) | 0.00536 g (±2%) | 0.00536 g (±2%) |
| Hemi-Calcium bis [4-octylphenyl] phosphate | 0.00803 g (±2%) | 0.00803 g (±2%) | 0.00803 g (±2%) | 0.00803 g (±2%) |
| 4-hexylphenyl 2-nitrophenyl ether | 0.19012 g (±1.5%) | 0.19012 g (±1.5%) | 0.19012 g (±1.5%) | 0.19012 g (±1.5%) |
| Polyvinyl chloride-Mw ~140.000) | — | — | 0.07411 g (±1.5%) | — |
| Carboxylated PVC-1.8% carboxyl basis-mW ~220.000 | — | — | — | 0.03088 g (±1.5%) |
| Poly(vinyl chloride-co-vinyl acetate-co-vinyl alcohol)-PVC co-polymer containing 3% of vinyl acetate and 6% of vinyl alcohol-Mr ~24.500 (Fluka 27827) | — | 0.09321 g (±1.5%) | 0.01855 g (±1.5%) | 0.06183 g (±1.5%) |
| Co-polymer (SPP064) | 0.09321 g (±1.5%) | — | — | — |

Figure 1B:
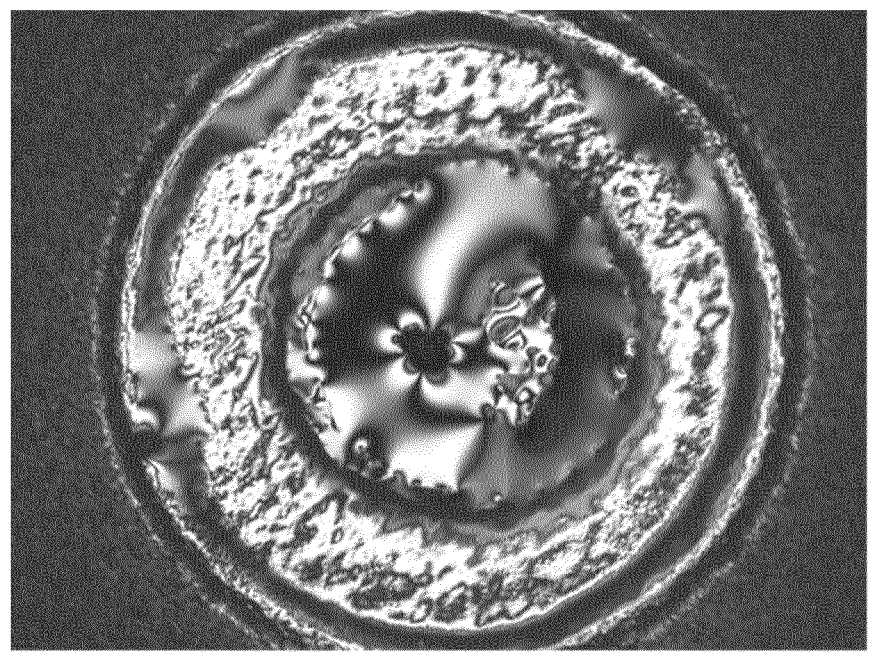
Figure 1C:
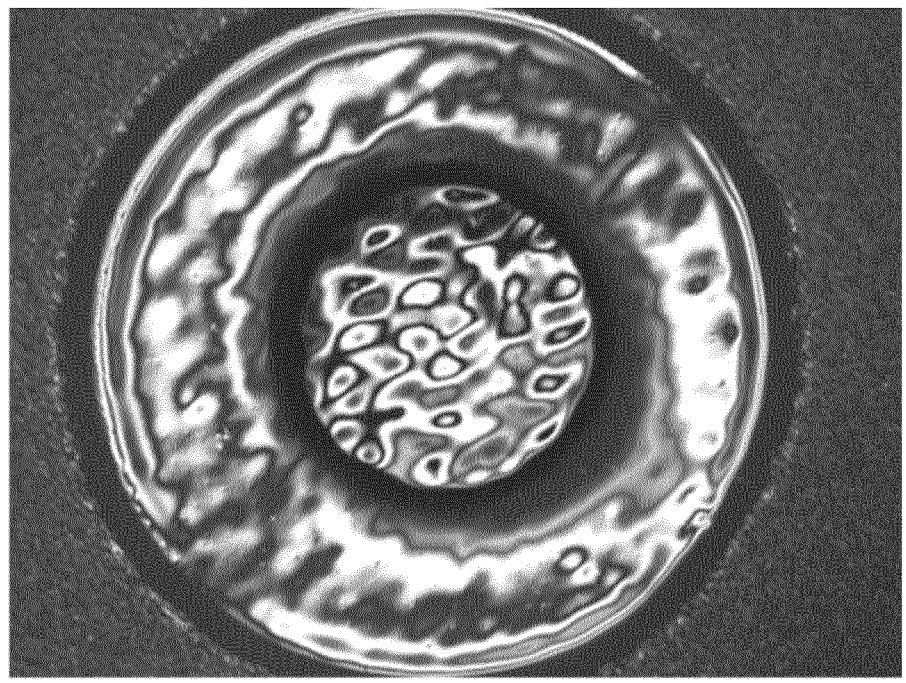
Figure 1D:
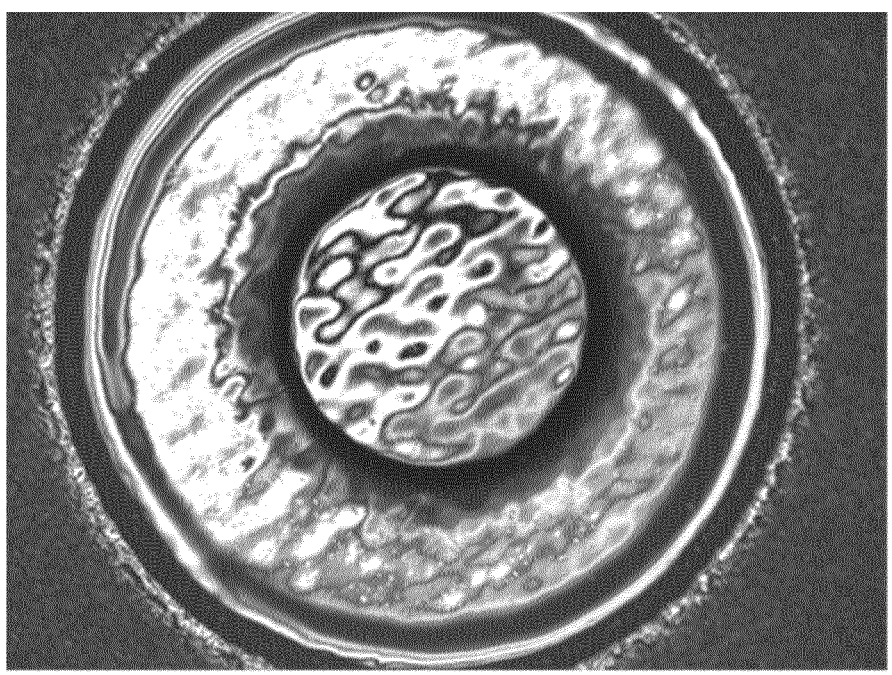

After overnight incubation, membrane integrity was investigated by optical microscopy using differential interference contrast, X5-objective. Results are shown in FIG. 1. Membranes containing 1000/poly(vinyl chloride-co-vinyl acetate-co-vinyl alcohol) showed signs of membrane bleeding, as the membrane mass was unevenly distributed over the sensor cavity and small liquid drops over the cavity were observed (FIG. 1, panels A and B). On the other hand, membranes comprising combinations of high molecular weight PVC or carboxylated PVC and poly(vinyl chloride-co-vinyl acetate-co-vinyl alcohol) were not bleeding as the membrane mass was evenly distributed and no liquid drops were observed on the membrane surface (FIG. 1, panels C and D).

Example 3: Determination of iMg Concentration in Blood Samples

The magnesium ion selective membranes Mg652 and Mg654 described in Example 2 were tested and compared for their ability to measure magnesium ions concentrations in blood samples. Each membrane was dispensed onto three individual electrodes of an electrode array, which also contained a $Ca^{2+}$ ion selective electrode. The membranes were dispensed as described in Example 1 except that a vanadium bronze was used as a transducer material instead of PEDOT. Each electrode array was placed into a measuring chamber in a test analyzer. The measuring chamber had fluidic contact with a reference electrode. The test analyzer was programmed for automatic control of liquid transport of calibration and rinse solutions, aspiration of samples, sampling of the potentiometric signal of each electrode position, and data acquisition thereof.

The $Mg^{2+}$ ion selective electrodes were calibrated using three calibration solutions containing $Mg^{2+}$ and $Ca^{2+}$ ions in three different ratios. The Nicolsky-Eisenman (NE) equation was used as sensor response model in accordance with IFCC guidelines (Ben Rayana et al. (2008) Clin Chem Lab Med 46(1):21). Status value (E0), sensitivity (S) and selectivity coefficient (K) for $Mg^{2+}$ ions over $Ca^{2+}$ ions, were determined based on the electrode signals obtained on the calibration solutions. The $Ca^{2+}$ ion selective electrodes were also calibrated. Three blood samples were prepared: one blood sample without further additions and two blood samples to which 1 mM $Mg^{2+}$ and 2 mM $Mg^{2+}$ had been added, respectively. Each sample was assayed five times. For each $Mg^{2+}$ ion selective electrode, the concentration of $Mg^{2+}$ ions (cMg) in the sample was calculated from the signal obtained on that particular sample by utilizing the values of the calibration parameters (E0, S, and K) determined for the electrode prior to the sample measurement and the concentration of $Ca^{2+}$ ions determined with the $Ca^{2+}$ ion selective electrode. No blood corrections were subsequently applied to the obtained cMg values. The results below show deviations of these uncorrected cMg values as compared to a reference cMg measurement on a NOVA-CCX analyzer.

Results:

| Membrane Mg652 (PVC:copolymer 4:1): | | | | | |
|---|---|---|---|---|---|
| Meas. No. Sample | Sensor I | Sensor II | Sensor III | AVG | STDEV |
| 1 Blood | 58.2% | 61.3% | 66.0% | | |
| 2 Blood | 49.7% | 52.4% | 55.5% | | |
| 3 Blood | 43.3% | 45.6% | 50.2% | | |
| 4 Blood | 41.8% | 43.7% | 49.0% | | |
| 5 Blood | 41.2% | 43.1% | 48.0% | | |
| Average (normal Mg2+ level) | 46.8% | 49.2% | 53.7% | 49.9% | 3.5% |
| 1 Blood (1 mM Mg2+) | 62.4% | 64.4% | 72.9% | | |
| 2 Blood (1 mM Mg2+) | 58.8% | 60.3% | 66.7% | | |
| 3 Blood (1 mM Mg2+) | 58.8% | 60.7% | 66.0% | | |
| 4 Blood (1 mM Mg2+) | 56.4% | 58.6% | 61.3% | | |
| 5 Blood (1 mM Mg2+) | 54.2% | 56.5% | 58.4% | | |
| Average (1 mM Mg2+) | 58.1% | 60.1% | 65.0% | 61.1% | 3.6% |
| 1 Blood (2 mM Mg2+) | 67.3% | 70.5% | 74.0% | | |
| 2 Blood (2 mM Mg2+) | 64.1% | 66.9% | 69.0% | | |
| 3 Blood (2 mM Mg2+) | 63.4% | 66.5% | 69.1% | | |
| 4 Blood (2 mM Mg2+) | 61.3% | 64.3% | 66.4% | | |
| 5 Blood (2 mM Mg2+) | 61.2% | 63.4% | 65.6% | | |
| Average (2 mM Mg2+) | 63.5% | 66.3% | 68.8% | 66.2% | 2.7% |

| Membrane Mg654 (cPVC:copolymer 1:2): | | | | | |
|---|---|---|---|---|---|
| Meas. No. Sample | Sensor I | Sensor II | Sensor III | AVG | STDEV |
| 1 Blood | 23.0% | 22.9% | 23.3% | | |
| 2 Blood | 18.8% | 18.9% | 19.1% | | |
| 3 Blood | 16.0% | 16.0% | 16.7% | | |
| 4 Blood | 15.0% | 14.9% | 15.7% | | |
| 5 Blood | 14.4% | 14.2% | 15.5% | | |
| Average (normal Mg2+ level) | 17.4% | 17.4% | 18.1% | 17.6% | 0.4% |
| 1 Blood (1 mM Mg2+) | 32.3% | 32.5% | 33.8% | | |
| 2 Blood (1 mM Mg2+) | 31.1% | 31.0% | 32.8% | | |
| 3 Blood (1 mM Mg2+) | 31.2% | 31.0% | 32.6% | | |
| 4 Blood (1 mM Mg2+) | 30.8% | 30.9% | 32.4% | | |
| 5 Blood (1 mM Mg2+) | 30.2% | 30.1% | 31.6% | | |
| Average (1 mM Mg2+) | 31.1% | 31.1% | 32.6% | 31.6% | 0.9% |
| 1 Blood (2 mM Mg2+) | 39.8% | 39.8% | 41.3% | | |
| 2 Blood (2 mM Mg2+) | 38.6% | 38.5% | 39.9% | | |
| 3 Blood (2 mM Mg2+) | 38.6% | 38.6% | 39.9% | | |
| 4 Blood (2 mM Mg2+) | 37.8% | 37.8% | 39.2% | | |
| 5 Blood (2 mM Mg2+) | 37.9% | 37.8% | 39.4% | | |
| Average (2 mM Mg2+) | 38.5% | 38.5% | 39.9% | 39.0% | 0.8% |

The results show that while both membranes had good reproducibility and linearity for blood samples, membrane Mg654 had a smaller average deviation (AVG) from the reference (bias) than membrane Mg652 (17.6%/31.6%/39.05 vs. 49.9%/61.1%/66.2%).

Furthermore, the variation (standard deviation, STDEV) between the three membranes was smaller for membrane Mg654 than for membrane Mg652 (0.4%/0.9%/0.8% vs. 3.5%/3.6%/2.7%).

Example 4: Performance of Membranes Comprising a Single Polymer or a Polymer Blend Eight membranes were prepared to study the effect of polymer types and blends thereof on membrane performance. Four polymer types were included in the test: PVC, cPVC, SPP911 and F27827.

The eight membranes were prepared as described in Example 1, except that the compositions were as follows. The compositions were made to ensure a constant ratio between total mass of polymer(s) and total dry-mass of common membrane components.

| Membrane Compounds in Common for All Membrane IDs | Quantity (g) |
|---|---|
| hemi-calcium bis[4-octylphenyl]phosphate | 0.0288 |
| 4,7-diundecyl-1,10-phenanthroline | 0.2640 |
| 4-hexylphenyl 2-nitrophenyl ether (NHPE) | 2.1000 |
| MgOPP stock solution in cyclohexanone | 7.3900 |

| Membrane ID | Compound | Quantity (g) |
|---|---|---|
| PVC | PVC (high_MW = 140.000) Fluka 81392 | 1.0094 |
| | Extra cyclohexanone added to reduce viscosity | 0.2800 |
| cPVC | Poly(vinyl chloride-co-acrylic acid (carboxylated PVC-1.8% carboxyl basis-MW ~220,000 | 1.0094 |
| | Extra cyclohexanone added to reduce viscosity | 2.2600 |
| F27827 | Poly(vinyl chloride-co-vinyl acetate-co-vinyl alcohol)-PVC co-polymer containing 3% of vinyl acetate and 6% of vinyl alcohol-Mr ~ 24,500 (Fluka 27827) | 1.0094 |
| SPP911 | VC/VAc/HPA 80/5/15 (PVC Co-Polymer MW = 40.000) | 1.0094 |
| PVC + F27827 | PVC (high_MW = 140.000) Fluka 81392 | 0.3360 |
| | Poly(vinyl chloride-co-vinyl acetate-co-vinyl alcohol)-PVC co-polymer containing 3% of vinyl acetate and 6% of vinyl alcohol-Mr ~ 24,500 (Fluka 27827) | 0.6734 |
| PVC + SPP911 | PVC (high_MW = 140.000) Fluka 81392 | 0.3360 |
| | VC/VAc/HPA 80/5/15 (PVC Co-Polymer MW = 40.000) | 0.6734 |
| cPVC + F27827 | Poly(vinyl chloride-co-acrylic acid (carboxylated PVC-1.8% carboxyl basis-MW ~220,000 | 0.3360 |
| | Poly(vinyl chloride-co-vinyl acetate-co-vinyl alcohol)-PVC co-polymer containing 3% of vinyl acetate and 6% of vinyl alcohol-Mr ~24,500 (Fluka 27827) | 0.6734 |
| cPVC + SPP911 | Poly(vinyl chloride-co-acrylic acid (carboxylated PVC-1.8% carboxyl basis-MW ~220,000 | 0.3360 |
| | VC/VAc/HPA 80/5/15 (PVC Co-Polymer MW = 40.000) | 0.6734 |

Each membrane was dispensed onto four identical electrodes each positioned on identical electrode arrays, which also contained a $Ca^{2+}$ ion selective electrode. The membranes were dispensed as described in Example 1. Each electrode array was placed into a measuring chamber in a test analyzer as described in Example 3.

The $Mg^{2+}$ ion selective electrodes were calibrated as described in Example 3, but in a more complex solution matrix suitable for a simultaneous calibration of other sensors, e.g. Na, K, Ca, Cl, pH, $pO_2$, $pCO_2$, Glucose and Lactate sensors. The $Ca^{2+}$ ion selective electrodes were also calibrated. The calibrated sensors were then subjected to measurements on:

SSM (Separate Solution Method)-solutions: Two aqueous samples where one sample contained 100 mM $Mg^{2+}$ ions while the other sample contained 100 mM $Ca^{2+}$ ions. Both samples had a constant background of 5 mM HEPES buffer titrated to pH=7.4 at 37° C. and an ionic strength of 160 mM (adjusted by addition of NaCl).

FIM (Fixed Interference Method)-solutions: Eight aqueous samples with different concentrations of $Mg^{2+}$ ions {0.01; 0.05; 0.10; 0.50; 1.00; 5.00; 10.00; 50.00}mM in a constant background of 1.25 mM $Ca^{2+}$ ions, 5 mM HEPES buffer titrated to pH=7.4 at 37° C. and an ionic strength of 160 mM (adjusted by addition of NaCl).

Standard solutions: Five aqueous samples spanning the physiological relevant concentration range of $Mg^{2+}$ ions from 0.2 mM to 2.5 mM in a constant background of 1.25 mM $Ca^{2+}$ ions, 5 mM HEPES buffer titrated to pH=7.4 at 37° C. and an ionic strength of 160 mM (adjusted by addition of NaCl).

pH solutions: Three aqueous samples with "Low", "Normal" and "High" pH-values of 6.8, 7.4 and 7.8 at 37° C., respectively. All with a constant background of 0.50 mM $Mg^{2+}$ ions, 1.25 mM $Ca^{2+}$ ions, 5 mM HEPES buffer and an ionic strength of 160 mM (adjusted by addition of NaCl).

Zn solutions: "Normal", "High" and "Very high" concentrations of possible interferent $Zn^{2+}$ ions in human plasma. The 2 latter samples were prepared from the same plasma pool as the "Normal" sample by adding insignificant volumes of a 10 mM $ZnCl_2$ stock solution thereby obtaining added $Zn^{2+}$ ion concentrations of 27 μM and 156 μM, respectively, without any significant dilution of the sample $Mg^{2+}$ ions.

Selectivity constants $K_{Mg,Ca}^{pot}$ and sensitivities determined from measurements on SSM- and/or the FIM-solutions were calculated directly on basis of electrode signals in accordance with the Separate Solution Method (SSM) and Fixed Interference Method (FIM) described in Umezawa et al. (2000) Pure Appl Chem 72:1851.

TABLE 2

Sensitivities (S) and selectivity constants ($K_{Mg,Ca}^{pot}$) determined by different methods for ion selective electrodes prepared with membrane IDs: "PVC", "cPVC", "F27827", "SPP911", "PVC + SPP911", "PVC + F27827", "cPVC + SPP911" and "cPVC + F27827".

| | | Membrane ID | | | | | | | |
|---|---|---|---|---|---|---|---|---|---|
| Parameter | Method of determination | PVC | cPVC | F27827 | SPP911 | PVC + SPP911 | PVC + F27827 | cPVC + SPP911 | cPVC + F27827 |
| S [mV] | FIM | 30.17 | 29.05 | 30.12 | 30.25 | 28.70 | 30.69 | 28.25 | 30.24 |
| | Calibration (NE) | 30.03 | 29.56 | 29.92 | 29.91 | 30.14 | 29.93 | 28.35 | 29.68 |
| $K_{Mg,Ca}^{pot}$ [—] | FIM | 0.90 | 0.62 | 0.48 | 0.48 | 0.81 | 0.43 | 0.61 | 0.36 |
| | SSM | 0.86 | 0.68 | 0.40 | 0.39 | 0.92 | 0.31 | 0.70 | 0.29 |
| | Calibration (NE) | 1.12 | 0.78 | 0.57 | 0.56 | 1.19 | 0.49 | 0.73 | 0.38 |

TABLE 3

Relative bias [%] on cMg measured in aqueous samples ("pH solutions") with identical concentrations of $Mg^{2+}$ ions (0.50 mM), but different pH-values {6.8; 7.4; 7.8} at 37° C. cMg-values [mM] were measured with ion selective electrodes prepared with membrane IDs: "PVC", "cPVC", "F27827", "SPP911", "PVC + SPP911". "PVC + F27827", "cPVC + SPP911" and "cPVC + F27827". Bias values were calculated relative to the cMg-values measured on the sample with pH = 7.4.

| Sample | PVC | cPVC | SPP911 | F27827 | PVC + SPP911 | PVC + F27827 | cPVC + SPP911 | cPVC + F27827 |
|---|---|---|---|---|---|---|---|---|
| pH = 6.8 | 2.1% | 2.1% | 3.5% | 9.1% | 3.9% | 3.4% | 2.3% | 2.9% |
| pH = 7.8 | −1.9% | −2.1% | −2.8% | −6.1% | −4.5% | −3.0% | −2.5% | −2.6% |

TABLE 4

Relative bias [%] on cMg measured in plasma samples ("Zn solutions") with identical concentrations of $Mg^{2+}$ ions, but spiked to different concentrations of $Zn^{2+}$ ions {$cZn_{normal}$; $CZn_{normal}$ + 27 µM; $CZn_{normal}$ + 156 µM}. cMg-values [mM] were measured with ion selective electrodes prepared with membrane IDs: "PVC", "cPVC", "F27827", "SPP911", "PVC + SPP911", "PVC + F27827", "cPVC + SPP911" and "cPVC + F27827". Bias values were calculated relative to the cMg-values measured on the non-spiked plasma sample with $cZn = cZn_{normal}$.

| Sample | PVC | cPVC | SPP911 | F27827 | PVC + SPP911 | PVC + F27827 | cPVC + SPP911 | cPVC + F27827 |
|---|---|---|---|---|---|---|---|---|
| $cZn_{normal}$ + 27 µM | −5.4% | −3.5% | 4.0% | 5.8% | 1.6% | 5.1% | 1.6% | 3.6% |
| $cZn_{normal}$ + 156 µM | 5.7% | 6.6% | 35.5% | 51.1% | 24.1% | 47.6% | 20.0% | 37.4% |

TABLE 5 cMg [mM] in aqueous samples ("Standard solutions") with different concentrations of $Mg^{2+}$ ions measured with ion selective electrodes prepared with membrane IDs: "PVC", "cPVC", "F27827", "SPP911", "PVC + SPP911", "PVC + F27827", "cPVC + SPP911" and "cPVC + F27827". Numbers shown are the mean cMg-values calculated from two repeated measurements on four identical membranes. Numbers in parenthesis are the standard deviations on these eight measurements.

| Sample | PVC | cPVC | F27827 | SPP911 | PVC + SPP911 | PVC + F27827 | cPVC + SPP911 | cPVC + F27827 |
|---|---|---|---|---|---|---|---|---|
| 0.200 mM $Mg^{2+}$ | 0.199 (0.012) | 0.218 (0.006) | 0.177 (0.009) | 0.195 (0.004) | 0.157 (0.008) | 0.191 (0.008) | 0.205 (0.028) | 0.198 (0.007) |
| 0.598 mM $Mg^{2+}$ | 0.674 (0.004) | 0.660 (0.003) | 0.624 (0.003) | 0.614 (0.002) | 0.596 (0.007) | 0.632 (0.003) | 0.624 (0.028) | 0.630 (0.003) |
| 0.991 mM $Mg^{2+}$ | 1.156 (0.005) | 1.113 (0.007) | 1.086 (0.005) | 1.056 (0.003) | 1.041 (0.014) | 1.093 (0.005) | 1.056 (0.027) | 1.076 (0.007) |
| 1.744 mM $Mg^{2+}$ | 2.068 (0.010) | 1.968 (0.013) | 1.970 (0.009) | 1.911 (0.005) | 1.892 (0.026) | 1.979 (0.012) | 1.884 (0.041) | 1.925 (0.017) |
| 2.497 mM $Mg^{2+}$ | 3.002 (0.016) | 2.846 (0.020) | 2.880 (0.013) | 2.796 (0.006) | 2.759 (0.040) | 2.894 (0.019) | 2.725 (0.062) | 2.797 (0.027) |
| Slope | 1.221 | 1.145 | 1.178 | 1.135 | 1.133 | 1.179 | 1.099 | 1.133 |
| Intercept | −0.052 | −0.019 | −0.073 | −0.055 | −0.078 | −0.064 | −0.026 | −0.041 |
| R2 | 1.000 | 1.000 | 1.000 | 1.000 | 0.999 | 1.000 | 0.998 | 1.000 |

CONCLUSION

All tested membranes obtain linear response slopes in the upper cMg-range spanned by the FIM solutions and the response slopes are close to the theoretically expected Nernst sensitivity (~30 mV/decade) towards a divalent ion (Table 2). Of the four membranes containing only one polymer type the two membranes based on low molecular weight co-polymers ("SPP911" and "F27827") respond to $Mg^{2+}$ ions more selectively than to Ca2+ ions when compared to the two membranes based on higher molecular weight polymers ("PVC" and "cPVC"), i.e. membranes "SPP911" and "F27827" have lower selectivity coefficients ($K_{Mg,Ca}^{pot}$). However, drawbacks from using the low molecular co-polymers are, beside the issue with membrane integrity (cf. Example 2), that the resulting membranes show an increased interference from pH and $Zn^{2+}$ ions, cf. Table 3 & 4.

If instead using a blend of a low molecular weight co-polymer (SPP911 or F27827) and a higher molecular weight polymer (PVC or cPVC), then membranes ("PVC+ SPP911", "PVC+F27827", "cPVC+SPP911" and "cPVC+ F27827"), which balance requirements to membrane integrity, high $Mg^{2+}$ over $Ca^{2+}$ selectivity and interference from pH and $Zn^{2+}$, can be obtained.

When calibrating the membranes in a complex solution background, which is suitable for a simultaneous calibration of other sensors, e.g. Na, K, Ca, Cl, pH, $pO_2$, $pCO_2$, Glucose and Lactate sensors, good correspondence between the calibrated sensitivities and selectivity constants and those based on FIM- and SSM-solutions is obtained for all membranes except "PVC" and "PVC+SPP911", which show the largest deviations on sensitivities and/or selectivity coefficients (Table 2). This indicate that these two membranes are more affected than the other membranes by substances in the complex solution background of the calibration solution, i.e., substances which are also present in blood. This is in line with the results presented in Example 3, where membranes based on cPVC have lower blood bias than those based on PVC. Accordingly, the PVC-based membranes measure less accurately on the standard solutions (Table 5), e.g., their slope values deviate more from unity and their intercept values deviates more from zero when compared to the cPVC-based membranes.

The invention claimed is:

1. An ion-selective membrane comprising an ionophore and a polymer blend, wherein said polymer blend comprises:
   a. a first polymer which is carboxylated poly(vinyl chloride), wherein the weight average molecular weight of said first polymer is from 100,000 to 500,000, and
   b. a second polymer, which is a co-polymer of vinyl chloride and at least one further monomer group having a hydrophilic group, wherein the weight average molecular weight of said second polymer is below 100,000, and
   wherein said second polymer has more hydrophilic groups than said first polymer.

2. The membrane according to claim 1, wherein said second polymer has at least 1.5-fold more hydrophilic groups than said first polymer.

3. The membrane according to claim 1, wherein said carboxylated poly(vinyl chloride) is between 0.1% and 10% carboxylated.

4. The membrane according to claim 1, wherein the weight average molecular weight of said first polymer is at least 110,000.

5. The membrane according to claim 1, wherein said further monomer group is vinyl alcohol, a vinyl ester, or a hydroxy-functional acrylate.

6. The membrane according to claim 5, wherein said further monomer group is vinyl alcohol, a vinyl ester or a hydroxy-functional acrylate selected from the group consisting of hydroxypropylacrylate and hydroxypropylmethacrylate.

7. The membrane according to claim 1, wherein said second polymer is a co-polymer of vinyl chloride, vinyl acetate, vinyl alcohol and, optionally, a further monomer comprising a hydrophilic group.

8. The membrane according to claim 1, wherein said second polymer is poly(vinyl chloride-co-vinyl acetate-co-vinyl alcohol).

9. The membrane according to claim 8, wherein said poly(vinyl chloride-co-vinyl acetate-co-vinyl alcohol) comprises between 75% and 98% vinyl chloride.

10. The membrane according to claim 8, wherein said poly(vinyl chloride-co-vinyl acetate-co-vinyl alcohol) comprises between 1% and 20% vinyl acetate.

11. The membrane according to claim 8, wherein said poly(vinyl chloride-co-vinyl acetate-co-vinyl alcohol) comprises between 1% and 15% vinyl alcohol.

12. The membrane according to claim 1, wherein the weight average molecular weight of the second polymer is between 30,000 and 90,000.

13. The membrane according to claim 1, wherein the ratio of the first polymer mass to the second polymer mass in the membrane is between 10:1 and 1:5.

14. The membrane according to claim 1, wherein the membrane further comprises a plasticizer.

15. The membrane according to claim 14, wherein the plasticizer is 4-hexylphenyl 2-nitrophenyl ether (NHPE), 2-nitrophenyl octyl ether (NPOE), 2-nitrophenyl decyl ether (NPDE), 2-nitrophenyl undecyl ether (NPUDE), 2-nitrophenyl dodecyl ether (ETH 217), 2-nitrophenyl tetradecyl ether (NPTDE) or [12-(4-ethylphenyl)dodecyl] 2-nitrophenyl ether (ETH 8045) or a mixture of any of these.

16. The membrane according to claim 1, wherein the ionophore is selective for magnesium ions, calcium ions, sodium ions, potassium ions, lithium ions, zinc ions or phosphate ions.

17. The membrane according to claim 1, wherein the ionophore is a phenanthroline compound of the formula II:

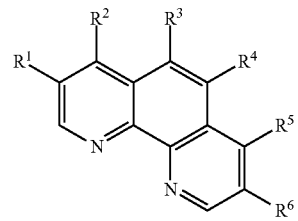

wherein each of $R^1$-$R^6$ is any of:

H;

any of F, Cl, Br, I, $NO_2$, CN, or $CF_3$;

$C_{1-18}$ alkyl;

$C_{1-18}$ aryl;

$C_{1-18}$ alkenyl;

$(CH_2)_m Y$, wherein m is 0 or an integer from 1 to 4, Y is any of —$OR^7$, —$NR^7R^8$, —$OCOR^7$, —$NR^7COR^8$, —$COR^7$, —$COOR^7$, —$SO_3R^7$, —$OSiR^7R^8R^9$, —$PO_4R^7R^8$, —$PO_3R^7R^8$, wherein each of $R^7$, $R^8$, and $R^9$ are any of H, alkyl, branched alkyl, aryl, or substituted aryl; or $C_n$—$R^{10}R^{11}$, wherein n is 0 or an integer between 1 and 17 inclusive, $R^{10}$ is C, N, NCO, or $CH_2$—Z—$CH_2$ wherein Z is any of O, NH, S, OCO, or CO, $R^{11}$ is

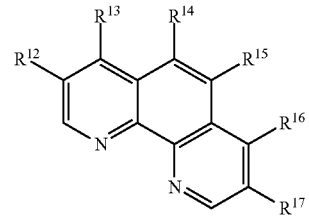

and $R^{11}$ is linked to $R^{10}$ at any of positions 3, 4, 5, 6, 7, or 8 of $R^{11}$, $R^{12}$-$R^{17}$ are any of H, $C_{1-18}$ alkyl, $C_{1-18}$ aryl, or absent, provided that if $R^{11}$ is linked to $R^{10}$ at position 3 of $R^{11}$ then $R^{12}$ is absent, if $R^{11}$ is linked to $R^{10}$ at position 4 of $R^{11}$ then $R^{13}$ is absent, if $R^{11}$ is linked to $R^{10}$ at position 5 of $R^{11}$ then $R^{14}$ is absent, if $R^{11}$ is linked to $R^{10}$ at position 6 of $R^{11}$ then $R^{15}$ is absent, if $R^{11}$ is linked to $R^{10}$ at position 7 of $R^{11}$ then $R^{16}$ is absent, if $R^{11}$ is linked to $R^{10}$ at position 8 of $R^{11}$ then $R^{17}$ is absent, provided that one of $R^1$-$R^6$ is other than H and that each of the C atoms at positions 2 and 9 of the 1,10-phenanthroline is bonded, by the bond which does not participate in the fused ring structure, to an H.

18. The membrane according to claim 1, wherein the ionophore is 4-undecyl-1,10-phenanthroline or 4,7-diundecyl-1,10-phenanthroline.

19. The membrane according to claim 1, wherein the membrane further comprises a lipophilic compound comprising an acidic group, wherein the lipophilic compound is a compound of the formula I:

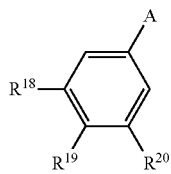

wherein A is an acidic group, wherein one, two or all three of $R^{18}$, $R^{19}$ and $R^{20}$ is a $C_{4-18}$ group, which is a $C_{4-18}$ alkyl group, a $C_{4-18}$ alkenyl group, a $C_{4-18}$ alkynyl group, or an amide-containing $C_{4-18}$ group, wherein said $C_{4-18}$ group is linear at positions 1, 2 and 3, counting from the phenyl group, or in total only has one side chain at said positions 1, 2 and 3, and wherein the others of $R^{18}$, $R^{19}$ and $R^{20}$ independently are hydrogen, or a linear $C_{1-18}$ alkyl group, or wherein the membrane further comprises a salt of said lipophilic compound.

20. The membrane according to claim 19, wherein the compound is a lipophilic salt and said salt is hemi-calcium bis[4-octylphenyl]phosphate, hemi-magnesium bis[4-octylphenyl]phosphate, hemi-calcium bis[4-(1,1,3,3-tetramethylbutyl)phenyl] phosphate, hemi-magnesium bis[4-(1,1,3,3-tetramethylbutyl)phenyl]phosphate, or a mixture of is hemi-calcium bis[4-octylphenyl]phosphate and hemi-magnesium bis[4-octylphenyl]phosphate.

21. The membrane according to claim 1, wherein the membrane comprises an ionophore covalently linked to an acidic group via a spacer wherein said spacer comprises at least one carbon atom or a salt thereof.

22. A process for preparing a magnesium ion selective membrane comprising mixing the components specified in claim 1 in a solvent, dispensing the resulting solution on a desired support and allowing the solvent to evaporate.

23. An electrode for determining the magnesium ion concentration of a liquid sample comprising the membrane of claim 1.

24. A potentiometric sensor for determining the magnesium ion concentration of a liquid sample comprising the electrode of claim 23 a reference electrode.

25. A method for determining the magnesium ion concentration of a liquid sample comprising contacting said sample with a potentiometric sensor according to claim 24 and determining the magnesium ion concentration based on signal provided by said potentiometric sensor.

26. A method for diagnosing a disease or disorder, said method comprising performing the method according to claim 25 on a sample of a subject.

27. A method for determining the magnesium ion concentration of a liquid sample comprising contacting said sample with an electrode according to claim 23 and determining the magnesium ion concentration based on signal provided by said electrode.

28. A method for diagnosing a disease or disorder, said method comprising performing the method according to claim 27 a sample of a subject.

* * * * *